United States Patent
Khoche

(10) Patent No.: US 12,086,757 B2
(45) Date of Patent: Sep. 10, 2024

(54) DISTRIBUTED AGENT OPERATING SYSTEM AND HARDWARE INSTANTIATION TO OPTIMIZE GLOBAL OBJECTIVES

(71) Applicant: Trackonomy Systems, Inc., Santa Clara, CA (US)

(72) Inventor: Ajay Khoche, West San Jose, CA (US)

(*) Notice: Subject to any disclaimer, the term of this patent is extended or adjusted under 35 U.S.C. 154(b) by 699 days.

(21) Appl. No.: 16/680,469

(22) Filed: Nov. 11, 2019

(65) Prior Publication Data

US 2020/0151655 A1    May 14, 2020

Related U.S. Application Data

(60) Provisional application No. 62/758,506, filed on Nov. 9, 2018.

(51) Int. Cl.
*G06Q 10/087* (2023.01)
*G06K 19/06* (2006.01)
*G06K 19/07* (2006.01)

(52) U.S. Cl.
CPC ..... *G06Q 10/087* (2013.01); *G06K 19/06037* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 5,917,433 A | 6/1999 | Keillor et al. | |
| 6,614,392 B2 | 9/2003 | Howard | |
| 6,919,803 B2 | 7/2005 | Breed | |
| 7,009,517 B2 | 3/2006 | Wood | |
| 7,353,259 B1 | 4/2008 | Bakke | |
| 7,427,918 B2 | 9/2008 | Fano | |
| 8,258,953 B2 * | 9/2012 | Stern | G06K 7/0008 340/572.1 |
| 8,356,207 B2 | 1/2013 | Hosek et al. | |
| 8,754,748 B2 * | 6/2014 | Orlassino | G06K 7/10386 340/568.1 |
| 9,015,071 B2 | 4/2015 | Breed | |
| 9,182,231 B2 | 11/2015 | Skaaksrud | |
| 9,189,226 B2 | 11/2015 | Driesen et al. | |
| 9,767,516 B1 | 9/2017 | Konrardy et al. | |
| 9,799,149 B2 | 10/2017 | Davidson | |
| 9,824,329 B2 | 11/2017 | Stirling et al. | |

(Continued)

FOREIGN PATENT DOCUMENTS

| | | |
|---|---|---|
| CA | 3008512 A1 | 12/2018 |
| JP | 2008239282 | 10/2008 |
| WO | WO 2019/028269 A1 | 2/2019 |

OTHER PUBLICATIONS

International Patent Application No. PCT/2021/051383, International Search Report and Written Opinion dated Dec. 28, 2021, 15 pages.

(Continued)

*Primary Examiner* — Fateh M Obaid

(57) ABSTRACT

The disclosure relates to logistics and more particularly to asset management, including packaging, tracking, warehousing, inventorying, and monitoring items (e.g., objects, parcels, persons, tools and other equipment). In particular, the disclosure relates to distributed agent operating systems and hardware instantiations to optimize global objectives.

20 Claims, 19 Drawing Sheets

(56) References Cited

U.S. PATENT DOCUMENTS

| | | | |
|---|---|---|---|
| 9,854,556 B2 | 12/2017 | Skaaksrud et al. | |
| 9,860,688 B2 | 1/2018 | Kulkarni et al. | |
| 9,875,459 B2* | 1/2018 | Altamirano | E21B 43/26 |
| 9,984,350 B2 | 5/2018 | Skaaksrud | |
| 10,057,722 B2 | 8/2018 | Skaaksrud | |
| 10,674,346 B2* | 6/2020 | Faccin | H04W 12/06 |
| 11,115,732 B2 | 9/2021 | Lucrecio et al. | |
| 2003/0018927 A1 | 1/2003 | Gadir et al. | |
| 2004/0039424 A1* | 2/2004 | Merritt | A61N 1/3708 |
| | | | 607/29 |
| 2004/0193467 A1 | 9/2004 | Williams et al. | |
| 2006/0071783 A1* | 4/2006 | Culpepper | G08B 21/0269 |
| | | | 340/539.13 |
| 2006/0158328 A1* | 7/2006 | Culpepper | G08B 21/0269 |
| | | | 340/572.1 |
| 2007/0049291 A1 | 3/2007 | Kim et al. | |
| 2007/0077943 A1* | 4/2007 | Hamilla | G06Q 10/087 |
| | | | 455/457 |
| 2007/0095905 A1 | 5/2007 | Kadaba | |
| 2008/0001712 A1* | 1/2008 | Agarwal | G06Q 10/087 |
| | | | 709/248 |
| 2008/0239282 A1 | 10/2008 | Zou et al. | |
| 2008/0279103 A1* | 11/2008 | Yong | H04L 45/245 |
| | | | 370/235 |
| 2009/0147702 A1* | 6/2009 | Buddhikot | H04L 67/34 |
| | | | 370/255 |
| 2010/0029268 A1* | 2/2010 | Myer | F21V 14/02 |
| | | | 340/521 |
| 2010/0045436 A1* | 2/2010 | Rinkes | H04Q 9/00 |
| | | | 340/10.1 |
| 2010/0067420 A1* | 3/2010 | Twitchell, Jr. | H04W 4/029 |
| | | | 370/311 |
| 2010/0082870 A1 | 4/2010 | Tokuhara | |
| 2010/0299401 A1 | 11/2010 | Lloyd | |
| 2010/0315203 A1* | 12/2010 | Peden, II | G06Q 10/087 |
| | | | 705/28 |
| 2011/0068923 A1* | 3/2011 | Burket | G08B 13/1427 |
| | | | 340/572.1 |
| 2011/0139871 A1 | 6/2011 | Yturralde et al. | |
| 2013/0070636 A1 | 3/2013 | Farley et al. | |
| 2013/0089018 A1* | 4/2013 | Kim | H04W 8/02 |
| | | | 370/312 |
| 2013/0107770 A1 | 5/2013 | Marsden et al. | |
| 2013/0278412 A1 | 10/2013 | Kelly et al. | |
| 2015/0154531 A1* | 6/2015 | Skaaksrud | G01C 21/00 |
| | | | 705/14.66 |
| 2015/0154538 A1 | 6/2015 | Skaaksrud | |
| 2015/0154544 A1 | 6/2015 | Skaaksrud | |
| 2015/0154554 A1* | 6/2015 | Skaaksrud | H04W 4/38 |
| | | | 705/333 |
| 2015/0156747 A1* | 6/2015 | Skaaksrud | H04W 76/10 |
| | | | 455/456.1 |
| 2015/0349917 A1* | 12/2015 | Skaaksrud | H04W 52/40 |
| | | | 370/328 |
| 2016/0033800 A1* | 2/2016 | Liu | H01L 27/124 |
| | | | 257/29 |
| 2016/0217399 A1 | 7/2016 | Roelofs et al. | |
| 2016/0233927 A1 | 8/2016 | Wu | |
| 2016/0234104 A1* | 8/2016 | Hoffmann | H04L 12/4633 |
| 2016/0277884 A1* | 9/2016 | Ehrman | B60R 25/102 |
| 2017/0039666 A1 | 2/2017 | Kuersten et al. | |
| 2017/0279892 A1* | 9/2017 | Skaaksrud | H04W 52/322 |
| 2017/0280297 A1* | 9/2017 | Skaaksrud | H04L 43/16 |
| 2018/0046964 A1 | 2/2018 | Leoni et al. | |
| 2018/0052462 A1* | 2/2018 | Arena | H04W 4/029 |
| 2018/0132183 A1 | 5/2018 | Gattu | |
| 2018/0165568 A1* | 6/2018 | Khoche | G06K 19/07773 |
| 2018/0302807 A1* | 10/2018 | Chen | H04W 28/021 |
| 2019/0174449 A1* | 6/2019 | Shan | H04W 60/00 |
| 2019/0179298 A1 | 6/2019 | Hosek et al. | |
| 2019/0215729 A1* | 7/2019 | Oyman | H04L 5/0082 |
| 2019/0222055 A1 | 7/2019 | Khoche et al. | |
| 2019/0254013 A1* | 8/2019 | Chang | H04W 72/042 |
| 2019/0281588 A1* | 9/2019 | Zhang | H04L 5/0051 |
| 2019/0325173 A1* | 10/2019 | Tingler | G01S 5/02 |
| 2019/0362215 A1 | 11/2019 | Khoche | |
| 2019/0370624 A1 | 12/2019 | Khoche | |

OTHER PUBLICATIONS

International Patent Application No. PCT/2021/053442, International Search Report and Written Opinion dated Jan. 14, 2022, 17 pages.
European Patent Application No. 19837758.2 extended European search report, dated Feb. 25, 2022, 7 pages.
European Patent Application No. 19850357.5 extended European search report, dated Mar. 4, 2022, 8 pages.
U.S. Appl. No. 17/208,765 Office Action dated Jul. 14, 2022, 9 pages.
Extend European Search Report for European Patent Application No. 19883019.2 dated Jul. 27, 2022, 12 pages.
Non-Final Office Action for U.S. Appl. No. 17/208,765 dated Jul. 14, 2022, 9 pages.
International Patent Application No. PCT/US2019/042488, International Search Report and Written Opinion dated Nov. 5, 2019.
International Patent Application No. PCT/US2019/046588, International Search Report and Written Opinion dated Jan. 6, 2020 9 pages.
Chong Shen et al., "A mobility framework to improve heterogeneous wireless network services," Inderscience Enterprises Ltd., 2011.
Lucas Iacono, Wireless Sensor Network Protocols, Universidad De Mendoza, Argentina, 2011.
M.A. Matin et al., Overview of Wireless Sensor Network, Intech, 2012 (http://dx.doi.org/10.5772/49376.1).
Mario G. C. Cimino et al., "Wireless communication, identification, and sensing technologies enabling integrated logistics: a study in the harbor environment," Research Gate, Oct. 2015 (https://www.researchgate.net/publication/283117890_Wireless_communication_identification_and_sensing_technologies_enabling_integrated_logistics_a_-study_in_the_harbor_environment).
International Patent Application No. PCT/US2019/046588, International Preliminary Report on Patentability, dated Feb. 16, 2021, 7 pgs, Geneva, Switzerland.
PCT Application No. PCT/US2021/023545, International Search Report and Written Opinion dated Jun. 24, 2021, 10 pages.

* cited by examiner

DISTRIBUTED AGENT OPERATING SYSTEM AND HARDWARE INSTANTIATION TO OPTIMIZE GLOBAL OBJECTIVES

FIELD OF THE DISCLOSURE

The disclosure generally relates to logistics and more particularly to asset management, including packaging, tracking, warehousing, inventorying, and monitoring items (e.g., objects, parcels, persons, tools and other equipment).

BACKGROUND

This application relates in particular to power efficient logistics platforms.

SUMMARY

In an aspect, a wireless communication device includes an antenna, a wireless communication system, a processor coupled to the wireless communication system, an energy source, a one-time wake circuit that can be awoken only one time and thereby create a persistent unimpeded connection between the energy source and each of the processor and the wireless communication system, and at least one non-transitory processor readable medium comprising programmatic code which, when executed by the processor, configures the processor to perform operations comprising controlling the wireless communication system to communicate wireless messages with one or more other network nodes during respective communication windows specified in the processor readable medium.

Another aspect relates to a wireless communication method. In accordance this method, responsive to an event, a one-time wake circuit of a wireless communication device comprising and antenna, a wireless communication system, and energy source is woken. Responsive to the waking, a persistent electrical connection is created between the energy source and each of the processor and the wireless communication system. The processor executes programmatic code stored on at least one non-transitory processor readable medium component of the wireless communication device to perform operations comprising controlling the wireless communication system to communicate wireless messages with one or more other network nodes during respective communication windows specified in the processor readable medium.

In another aspect, a method of creating a hierarchical communications network is described. The method includes adhering a first tape node to a first parcel in a set of associated parcels. The first tape node includes a first type of wireless communication interface and a second type of wireless communication interface having a longer range than the first type of wireless communication interface. A second tape node is adhered to a second parcel in the set. The second tape node includes the first type of wireless communication interface. The second tape node is operable to communicate with the first tape node over a wireless communication connection established between the first type of wireless communication interfaces of the first and second tape nodes. The method further includes establishing, by an application executing on a computer system, a wireless communication connection with the second type of wireless communication interface of the first tape node, and transmitting, by the application, programmatic code executable by the first tape node to function as a master tape node with respect to the second tape node.

In another aspect, a hierarchical communications network is described. The hierarchical communications network includes a first tape node adhered to a first parcel in a set of associated parcels, the first tape node including a first type of wireless communication interface and a second type of wireless communication interface having a longer range than the first type of wireless communication interface. A second tape node is adhered to a second parcel in the set and includes the first type of wireless communication interface, where the second tape node is operable to communicate with the first tape node over a wireless communication connection established between the first type of wireless communication interfaces of the first and second tape nodes. A computer system is operable to execute an application to perform functions comprising establishing a wireless communication connection with the second type of wireless communication interface of the first tape node, and designating, by the application, the first tape node as a master tape node with respect to the second tape node.

A method of creating a hierarchical communications network also is described. The method includes activating a first tape node and adhering it to a first parcel in a set of associated parcels, the first tape node comprising a first type of wireless communication interface and a second type of wireless communication interface having a longer range than the first type of wireless communication interface. The method also includes activating second and third tape nodes and respectively adhering them to second and third parcels in the set of associated parcels. Each of the second and third tape nodes includes the first type of wireless communication interface and a respective sensor. Each of the second and third tape nodes also is operable to communicate with the first tape node over a wireless communication connection established between the first type of wireless communication interfaces of the first, second, and third tape nodes. An application executing on a computer system transmits to each of the second and third tape node programmatic code for detecting and responding to an event.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

I. Introduction

Figure 1A:
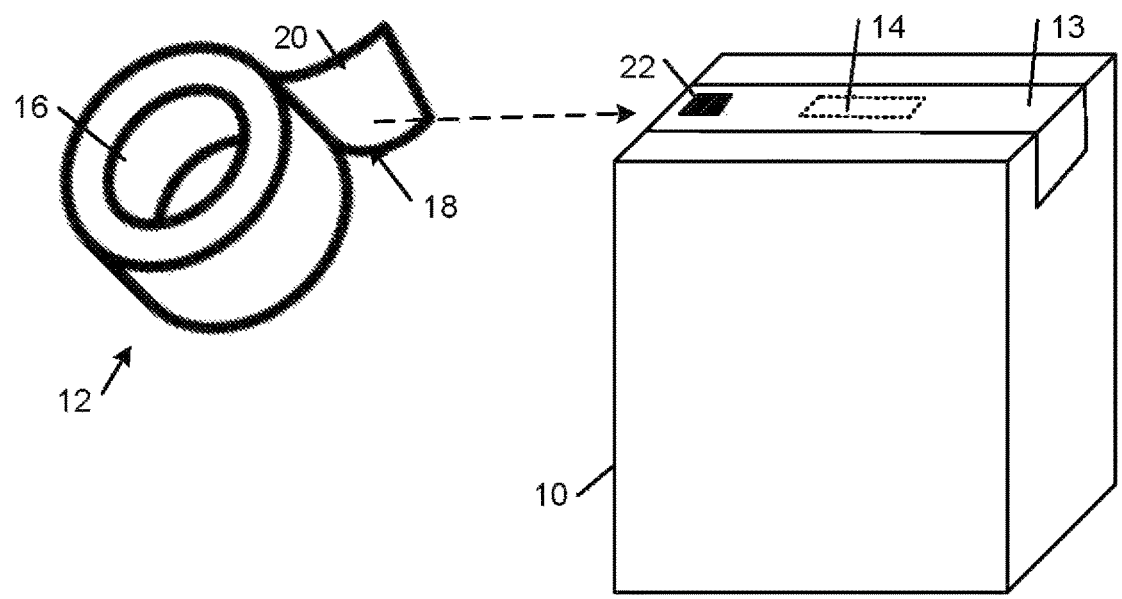
FIG. 1A is a diagrammatic view of a package that has been sealed for shipment using a segment of an example adhesive tape platform dispensed from a roll.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node can function, for example, as an adhesive tape, label, sticker, decal, or the like, and as a wireless communications device. A "peripheral" tape node (also referred to as an "outer" node, a "leaf" node, and "terminal" node) refers to a tape node that does not have any child nodes.

In certain contexts, the terms "parcel," "envelope," "box," "package," "container," "pallet," "carton," "wrapping," and the like are used interchangeably herein to refer to a packaged item or items.

This specification describes a low-cost, multi-function adhesive tape platform with a form factor that unobtrusively integrates the components useful for implementing a combination of different logistic functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various logistic applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of logistics management, including sealing parcels, transporting parcels, tracking parcels, monitoring the conditions of parcels, inventorying parcels, and verifying package security. In these examples, the sealed parcels typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

II. Adhesive Tape Platform

FIG. 1A shows an example package 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the package 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the package 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
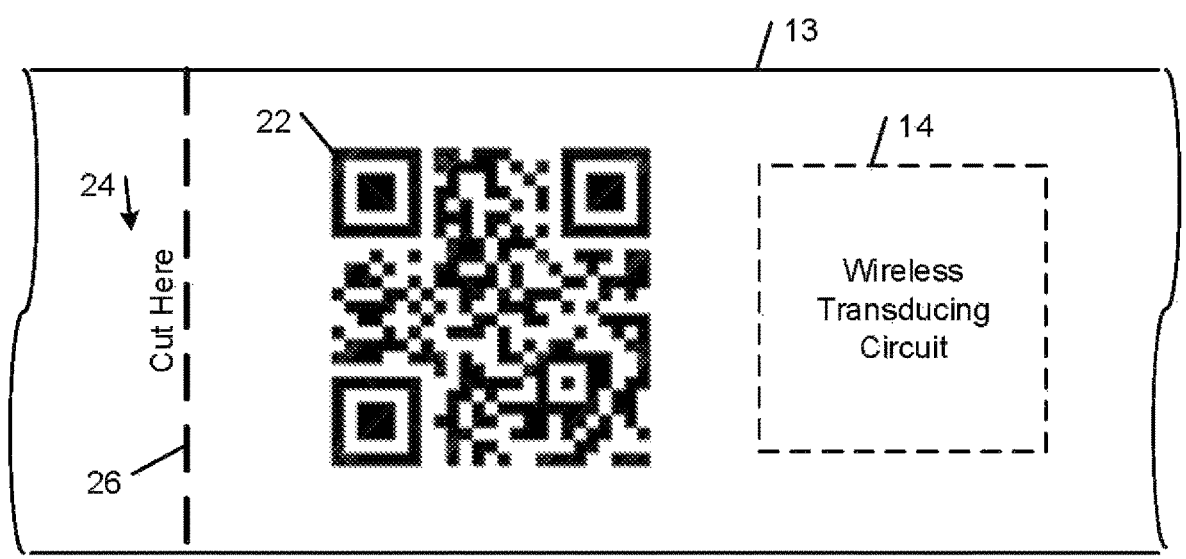
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the package 10 corresponds to a single segment of the adhesive tape platform 12. In other examples, the length of the adhesive tape platform 12 needed to seal a package or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the package 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
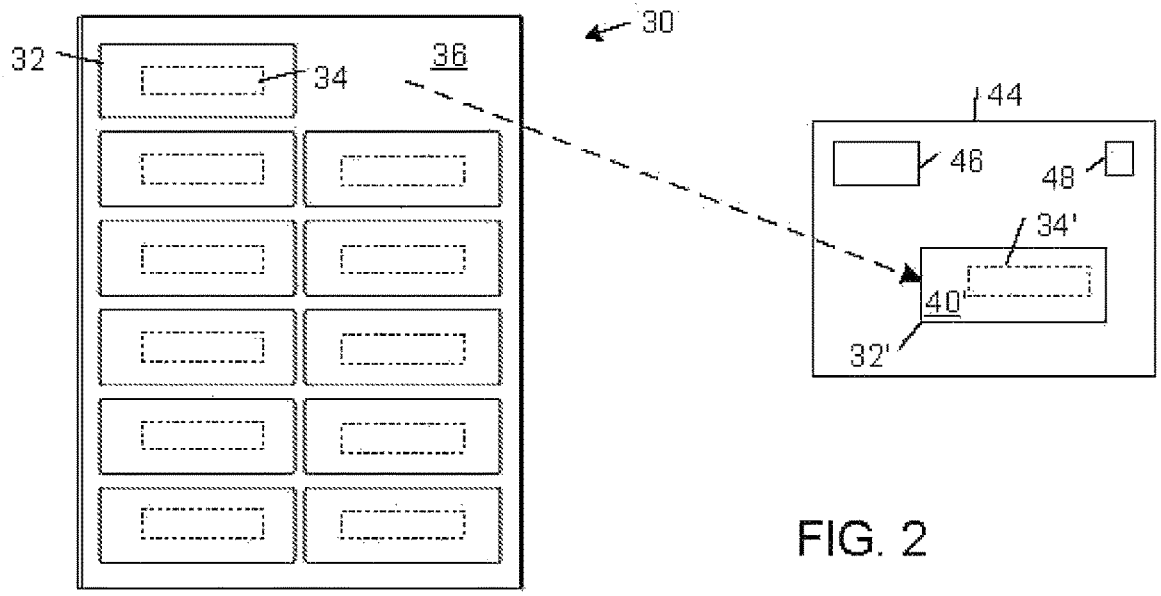
FIG. 2 is a diagrammatic view of an example of an envelope carrying a segment of an example adhesive tape platform dispensed from a backing sheet.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
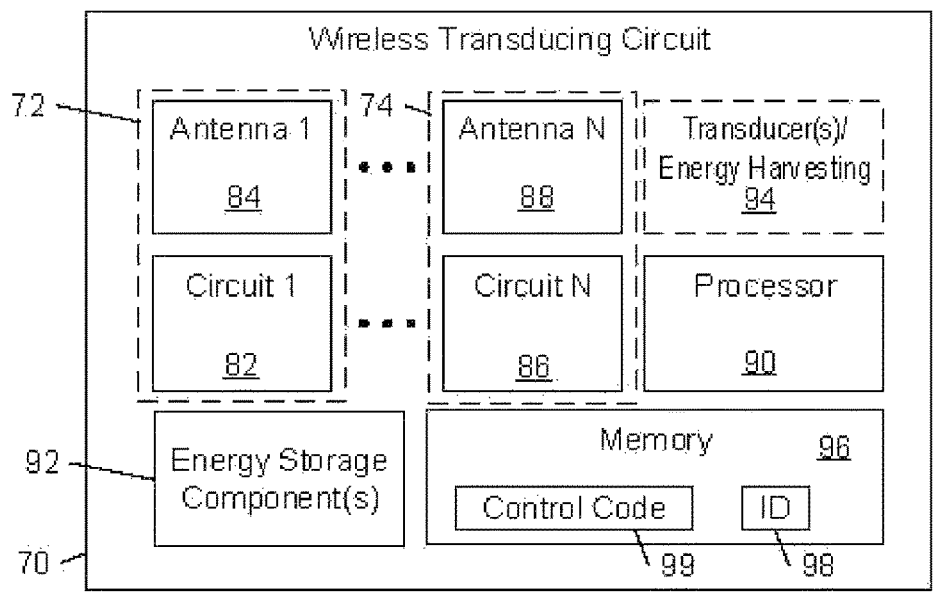
FIG. 3 is a schematic view of an example segment of an adhesive tape platform.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
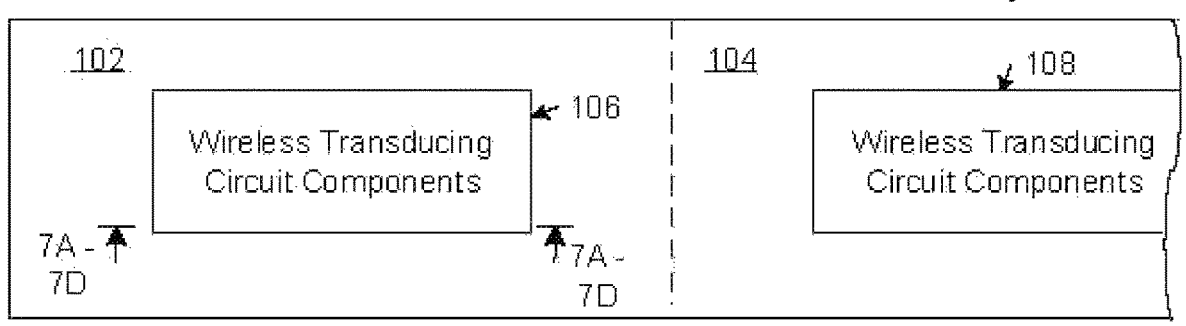
FIG. 4 is a diagrammatic top view of a length of an example adhesive tape platform.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other logistic functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
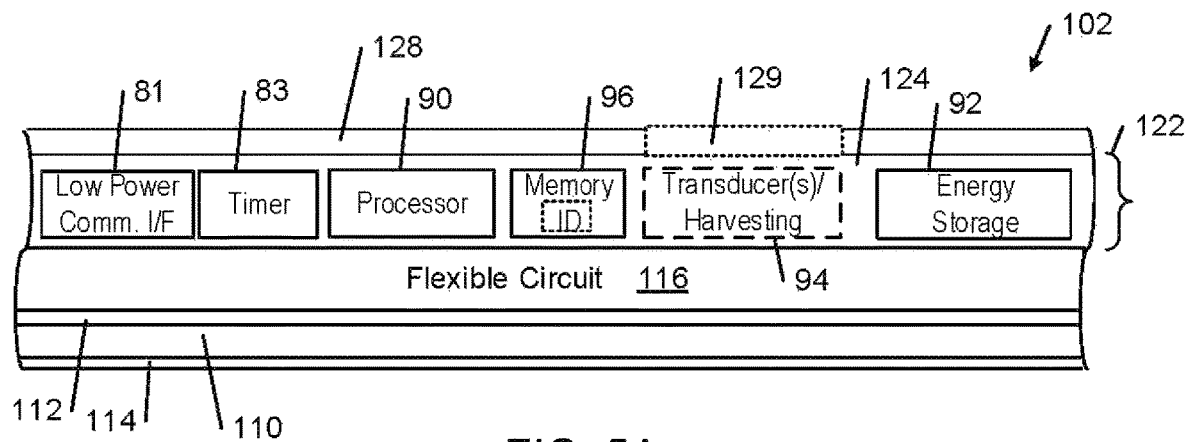
FIGS. 5A-5C show diagrammatic cross-sectional side views of portions of different respective adhesive tape platforms.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
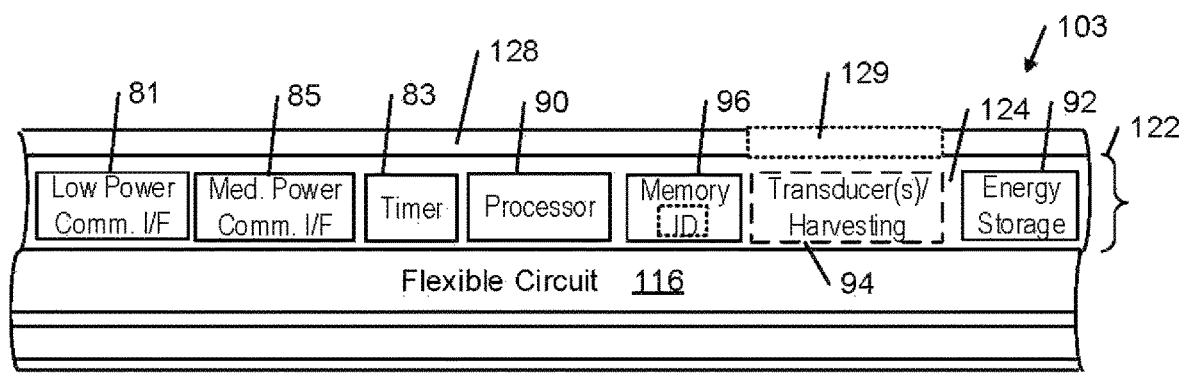

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
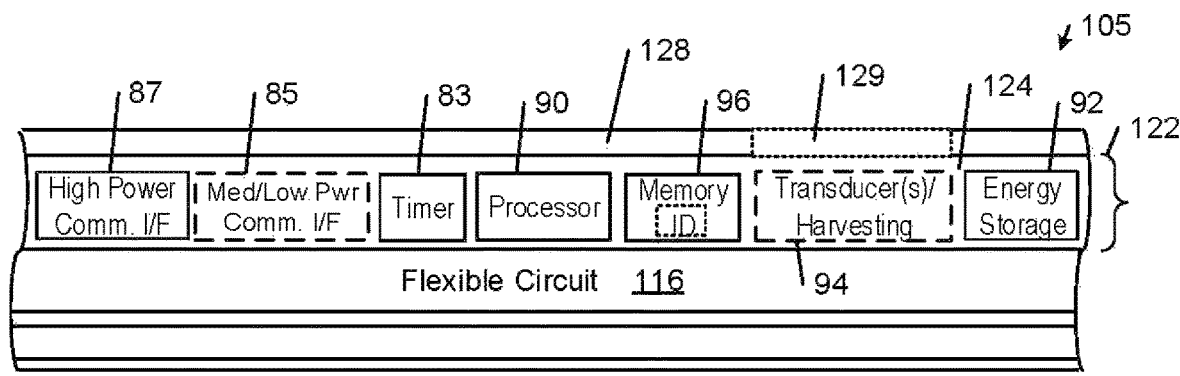

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, and U.S. Provisional Patent Application No. 62/670, 712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different package sizes with a desired number of wireless transducing circuits 70. In particular, the number of wireless transducing circuits per package size is given by the product of the sampling density specified for the adhesive tape platform and the respective size of the adhesive tape platform 100 needed to seal the package. This allows an automated packaging system to select the appropriate type of flexible adhesive tape platform 100 to use for sealing a given package with the desired redundancy (if any) in the number of wireless transducer circuits 70. In some example applications (e.g., shipping low value goods), only one wireless transducing circuit 70 is used per package, whereas in other applications (e.g., shipping high value goods) multiple wireless transducing circuits 70 are used per package. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Some logistics applications do not require tracking and/or sensor data for every parcel shipped. Instead, sufficient information for decision-making can be obtained by collecting data from a sample of the packages shipped. In these examples, a substantial reduction in shipment tracking costs can be realized by selecting a sampling density of the deployed wireless transducing circuits 70 that achieves a target tracked package sampling rate that is less than unity. In these embodiments, some packages would not be tracked or monitored. However, the sample size can be selected to be sufficient to make inferences about a population of packages shipped with a desired level of accuracy.

Figure 6A:
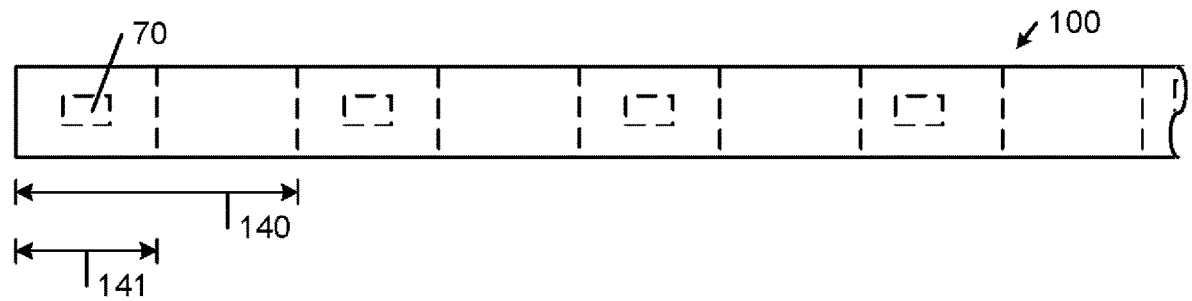
FIGS. 6A-6D show diagrammatic top views of lengths of example flexible adhesive tape platforms that have different respective sampling densities of wireless transducing circuits.

For example, FIG. 6A shows an example length of the flexible adhesive tape platform 100 in which the sampling density is 0.5 (i.e., one wireless transducing circuit per two unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, half of the packages would be sealed with a length of the flexible adhesive platform 100 that includes wireless transducing circuits 70.

Figure 6B:
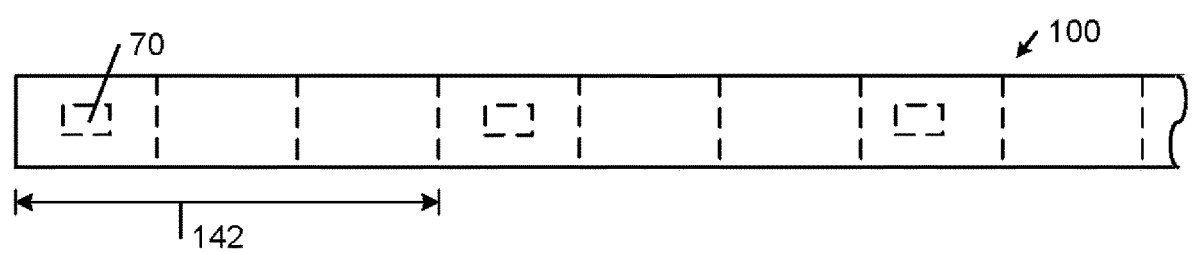

FIG. 6B shows an example length of the flexible adhesive tape platform 100 in which the sampling density is one-third (i.e., one wireless transducing circuit per three unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one third of the packages would be sealed with a length of the flexible adhesive platform 100 that includes wireless transducing circuits 70.

Figure 6C:
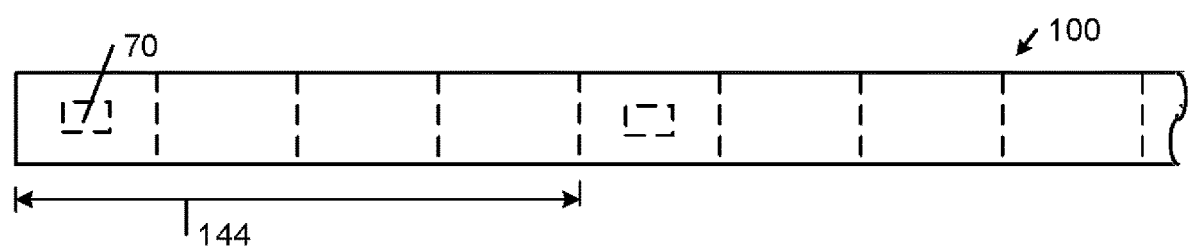

FIG. 6C shows an example length of the flexible adhesive tape platform 100 in which the sampling density is 0.25 (i.e., one wireless transducing circuit per four unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one fourth of the packages be sealed with a length of the flexible adhesive platform 100 that includes wireless transducing circuits 70.

Figure 6D:
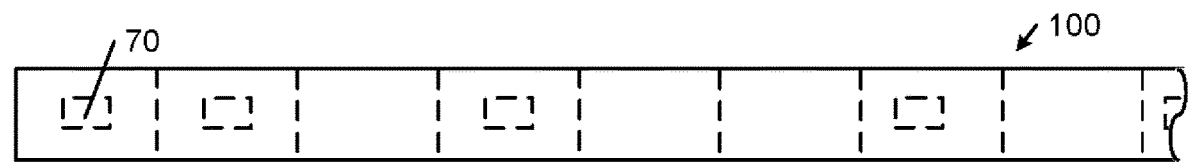

FIG. 6D shows an example length of the flexible adhesive tape platform 100 in which the sampling density is 0.25 (i.e., one wireless transducing circuit per two unit lengths 141 of the flexible adhesive tape platform 100). In this example, the wireless transducing circuits 70 are pseudo-randomly distributed along the length of the flexible adhesive tape platform 100 according to a probability distribution. Assuming the unit length corresponds to the length of the flexible adhesive tape platform 100 needed to seal a package and the flexible adhesive tape platform 100 is cut along the dashed lines, one half of the packages would be sealed with a length of the flexible adhesive platform 100 that includes wireless transducing circuits 70.

In the examples shown in FIGS. 6A-6D, a plurality of wireless transducing circuits 70 is distributed across the continuous flexible adhesive tape platforms 100 according to a respective sampling density. Each wireless transducing circuit 70 includes an antenna, a wireless communications circuit coupled to the antenna, a transducer, a controller electrically connected to the wireless communications circuit and the transducer, and an energy source connected to the controller, the transducer, and the wireless communications circuit. In some examples, the wireless transducing circuits are uniform in function and composition. In some examples, the sampling density is the density of wireless transducing circuits 70 as a function of a unit size of the continuous flexible adhesive tape platform. In some examples, the wireless transducing circuits are interspersed among regions of the continuous flexible adhesive tape platform 100 that are free of any wireless transducing circuits. In some applications, the wireless transducing circuits 70 are interspersed among the regions of the continuous flexible adhesive tape platform 100 that are free of any wireless transducing circuits according to a linear sampling density. In some examples, each of the regions of the continuous flexible adhesive tape platform 100 that are free of any wireless transducing circuits 70 is free of active electrical components. In other applications, the wireless transducing circuits 70 are interspersed among the regions of the continuous flexible adhesive tape platform 100 that are free of any wireless transducing circuits 70 according to an areal sampling density. In some examples, the wireless transducing circuits 70 are distributed at regular intervals along the continuous flexible adhesive tape platform 100. In some examples, the wireless transducing circuits 70 are distributed across the continuous flexible adhesive tape platform 100 according to a probability distribution. In some examples, the continuous flexible adhesive tape platform 100 is carried on a cylindrical tape core. In some examples, the regions of the continuous flexible adhesive tape platform 100 that include wireless transducing circuits 70 are visually indistinguishable from other regions of the continuous flexible adhesive tape platform 100.

In some examples, multiple different types continuous flexible adhesive tape platforms 100 are bundled together and packaged as a set. In these examples, the continuous flexible adhesive tape platforms 100 typically are carried on respective cylindrical tape cores and include respective pluralities of wireless transducing circuits 70 distributed across the respective platforms 100 according to respective sampling densities at least two of which are different. In some examples, a first continuous flexible adhesive tape platform 100 in the set includes a backing that includes a first visible marking and a second continuous flexible adhesive tape platform includes a backing that includes a second visible marking that is different from the first visible marking. In some examples, the first and second continuous flexible adhesive tape platforms are color-coded differently (e.g., the backing of different tape platforms are different respective colors).

In some examples, segments of the continuous flexible adhesive tape platforms 100 are used to monitor or detect the states or conditions of, surrounding, or affecting parcels and their respective assets. In accordance with one example, unit size portions of a continuous flexible adhesive tape platform 100 are dispensed, where the continuous flexible adhesive tape platform 100 includes a plurality of wireless transducing circuits 70 distributed across the platform according to a sampling density of wireless transducing circuits 70 as a function of the unit size portions of the continuous flexible adhesive tape platform and the sampling density is less than 1. The dispensed portion of the continuous flexible adhesive tape platform is affixed to seal a package. A network node of a network service (e.g., the network service 54 of an inventory management system) establishes a wireless connection with the wireless transducing circuit 70 in the affixed dispensed portion of continuous flexible adhesive tape platform. Based on a successful establishment of the wireless connection with the wireless transducing circuit 70, a unique identifier of the wireless transducing circuit 70 and transducer data from the wireless transducing circuit 70 are obtained. The obtained transducer data is reported in association with the unique identifier to a network node of the network 54. In some examples, the obtained transducer data includes geographic location data. In some examples, the obtained transducer data includes sensor data characterizing ambient conditions in the vicinity of the dispensed portion of the continuous flexible adhesive tape platform 100.

Because battery power is finite and the power needs of the adhesive tape platform segment for any particular application generally is unknown, some examples of the adhesive tape platform segments are preconfigured in a low power or a powered-off state, and remain in the low power or powered-off state until a predetermined event occurs. In some cases, the predetermined event indicates that the adhesive tape platform segment has been deployed for use in the field. Example events include cutting a segment of an adhesive tape platform from a roll, bending a segment of an adhesive tape platform as it is being peeled off of a roll, separating a segment of an adhesive tape platform from a backing sheet, and detecting a change in state of the adhesive tape platform or its environment. In some examples, a label is affixed to packaging containing the continuous flexible adhesive tape platform 100, where the label carries, e.g., text, barcode, and/or wireless identifier, such as an RFID circuit, that includes an indication of the sampling density of wireless transducing circuits 70 as a function of a unit size of the continuous flexible adhesive tape platform. In some examples, the unit size corresponds to a length dimension; in other examples the unit size corresponds to an areal dimension.

In some examples, an adhesive tape platform includes a one-time wake circuit that delivers power from a respective energy source to a respective wireless circuit (e.g., a circuit comprising a processor, one or more transducers, and one or more wireless communications circuits) in response to an event that wakes the one-time wake circuit.

Figure 7:
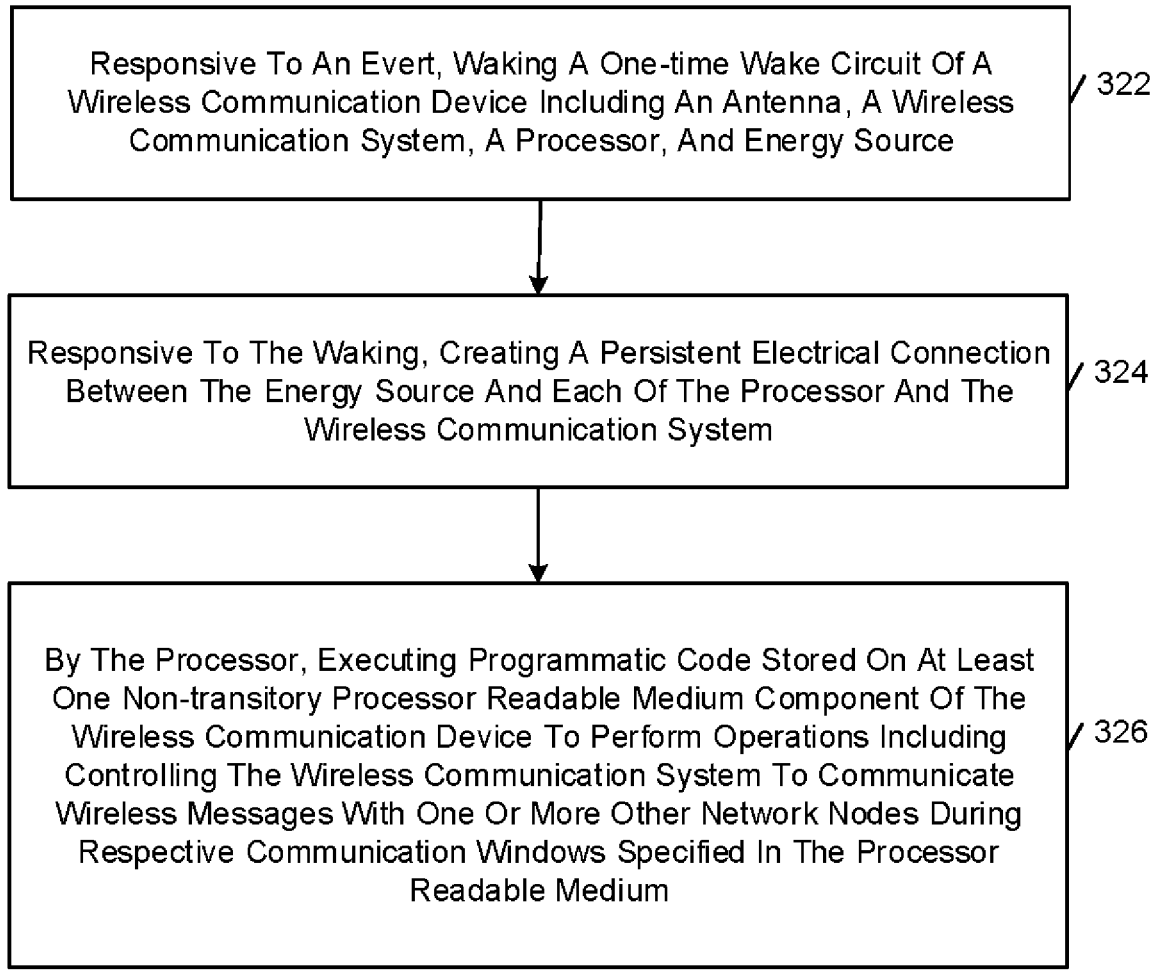
FIG. 7 is a flow diagram of a method of activating a wireless communication device by waking a one-time wake circuit.

FIG. 7 shows a series of operations performed by an example wireless communication device (e.g., an adhesive tape platform) that includes a one-time wake circuit between an energy source and each of the processor and the wireless communication system. Responsive to an event, the one-time wake circuit of the wireless communication device is woken (FIG. 7, block 322). Responsive to the waking of the one-time wake circuit, a persistent electrical connection between the energy source and each of the processor and the wireless communication system is created (FIG. 7, block 324). By the processor, executing programmatic code stored on at least one non-transitory processor readable medium component of the wireless communication device to perform operations including controlling the wireless communication system to communicate wireless messages with one or more other network nodes during respective communication windows specified in the processor readable medium (FIG. 7, block 326). In some examples, the communication windows referenced in block 326 are pre-determined and can be adaptively modified by the processor in an environment. In some examples, the predetermined schedule is obtained by analyzing the battery size, the tape node power consumption, and the tolerable latency in communication. A mathematical model is created that can be solved by the modern optimization algorithms (e.g., artificial intelligence, neural nets, and other machine learning computing systems). A scheduling language is used to specify the schedule for a set of nodes. The processor can adapt the environment using machine learning algorithms to optimize the performance in a given environment.

Figure 8A:
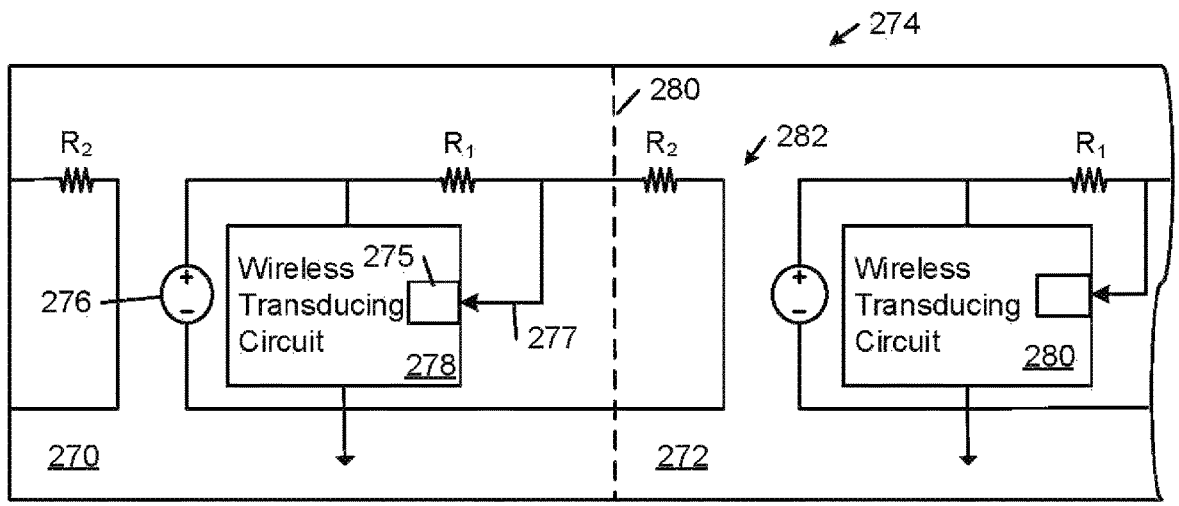
FIGS. 8A-8B show diagrammatic top views of respective lengths of example adhesive tape platforms.

Referring to FIG. 8A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors $R_1$ and $R_2$. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 8B:
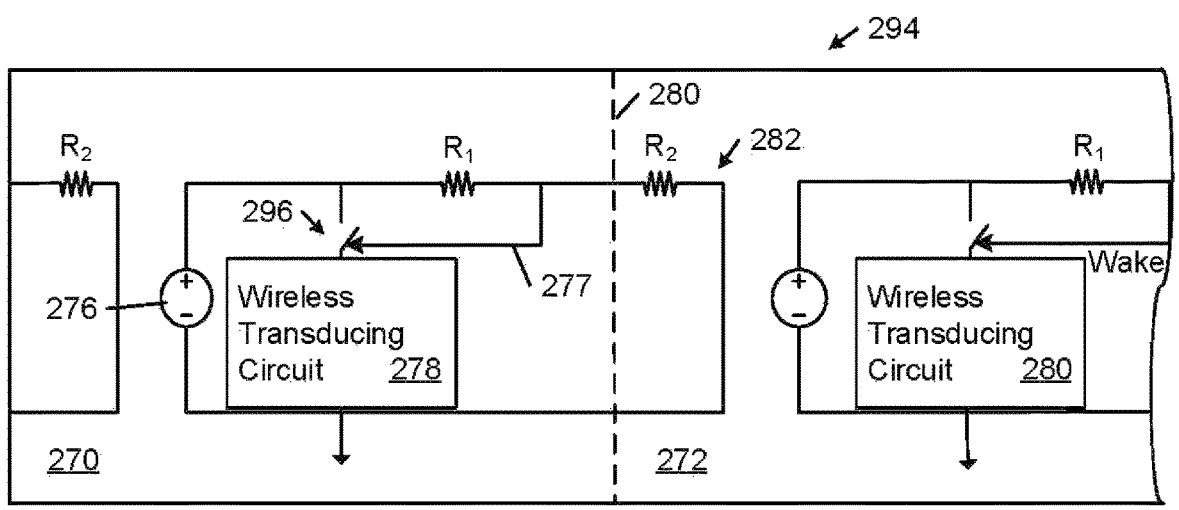

FIG. 8B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 8A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors $R_1$ and $R_2$. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 8C:
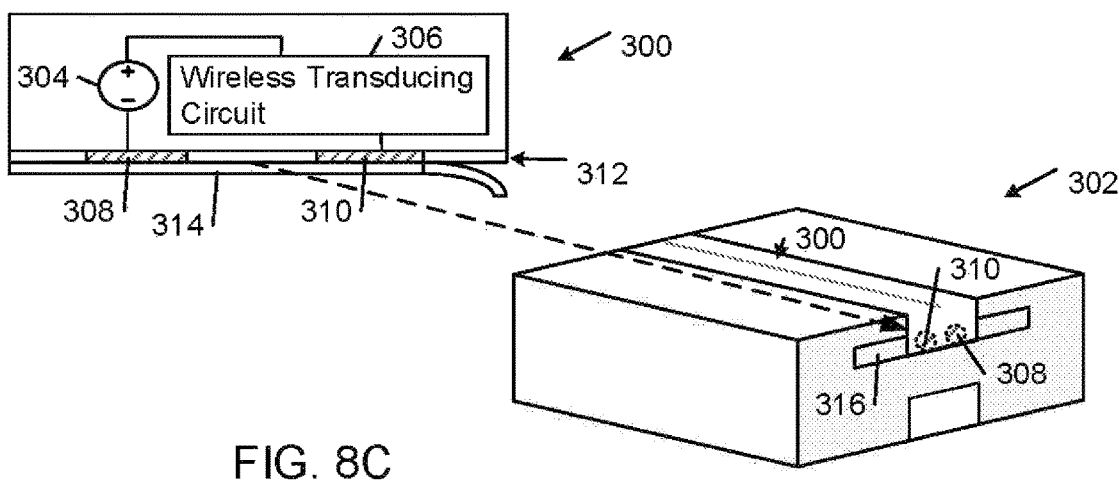
FIG. 8C is diagrammatic cross-sectional side view of an example adhesive tape platform and an example package.

FIG. 8C shows a diagrammatic cross-sectional front view of an example adhesive tape platform 300 and a perspective view of an example package 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the package 302. When the adhesive backside of the adhesive tape platform 300 is adhered to the package with the exposed terminals 308, 310 aligned and in contact with the electrically conductive region 316 on the package 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

III. Deployment of Tape Nodes

Figure 9:
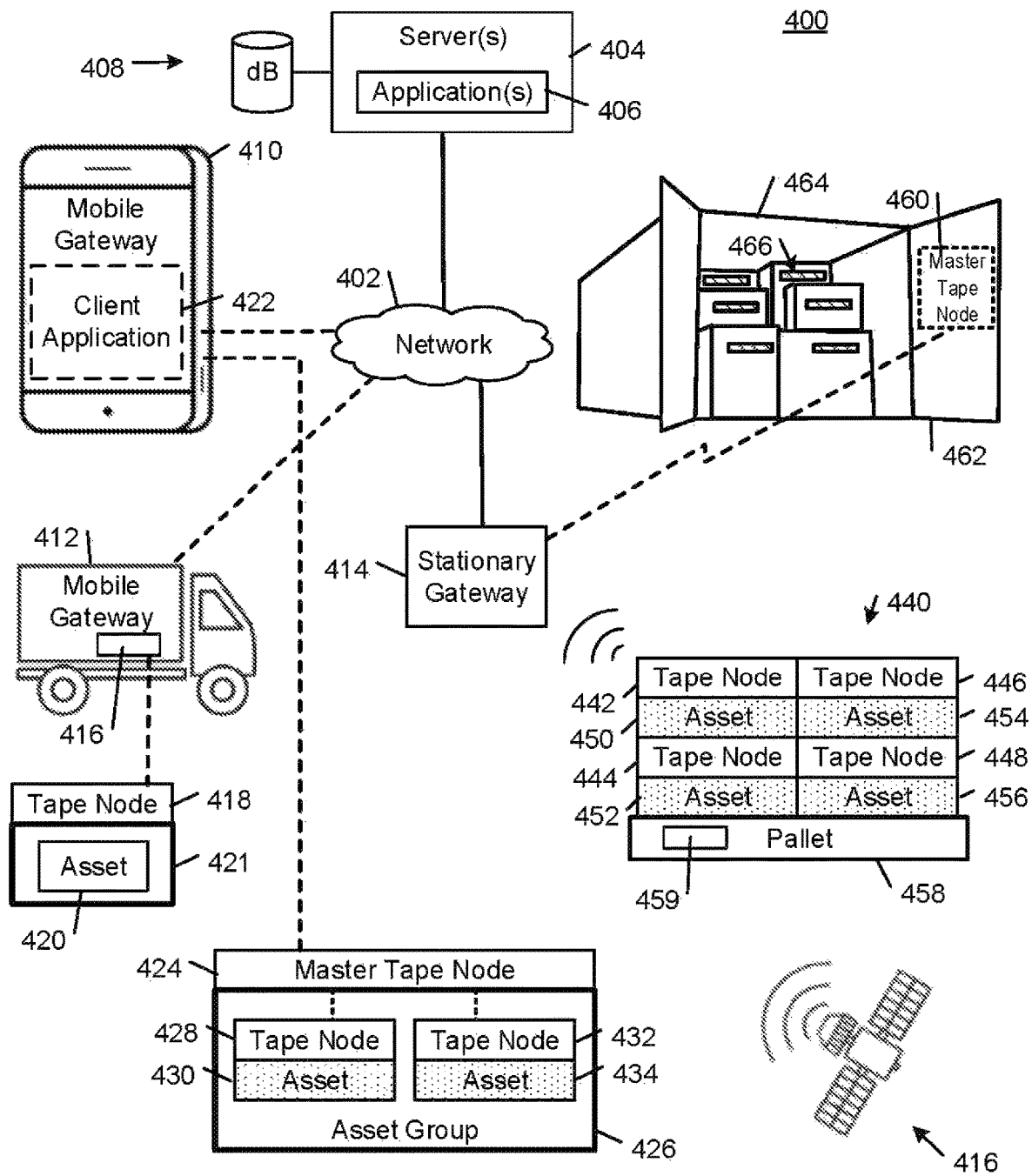
FIG. 9 is a diagrammatic view of an example of a network environment supporting communications with segments of an adhesive tape platform.

FIG. 9 shows an example network communications environment 400 that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a parcel, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 9, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

IV. Hierarchical Wireless Communications Network

Figure 10:
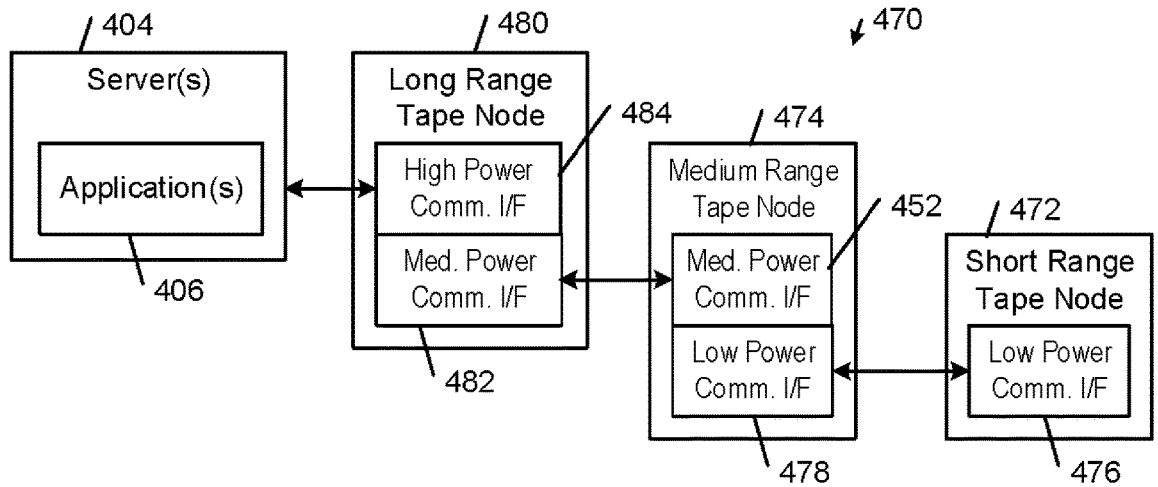
FIG. 10 is a diagrammatic view of a hierarchical communications network.

FIG. 10 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 11:
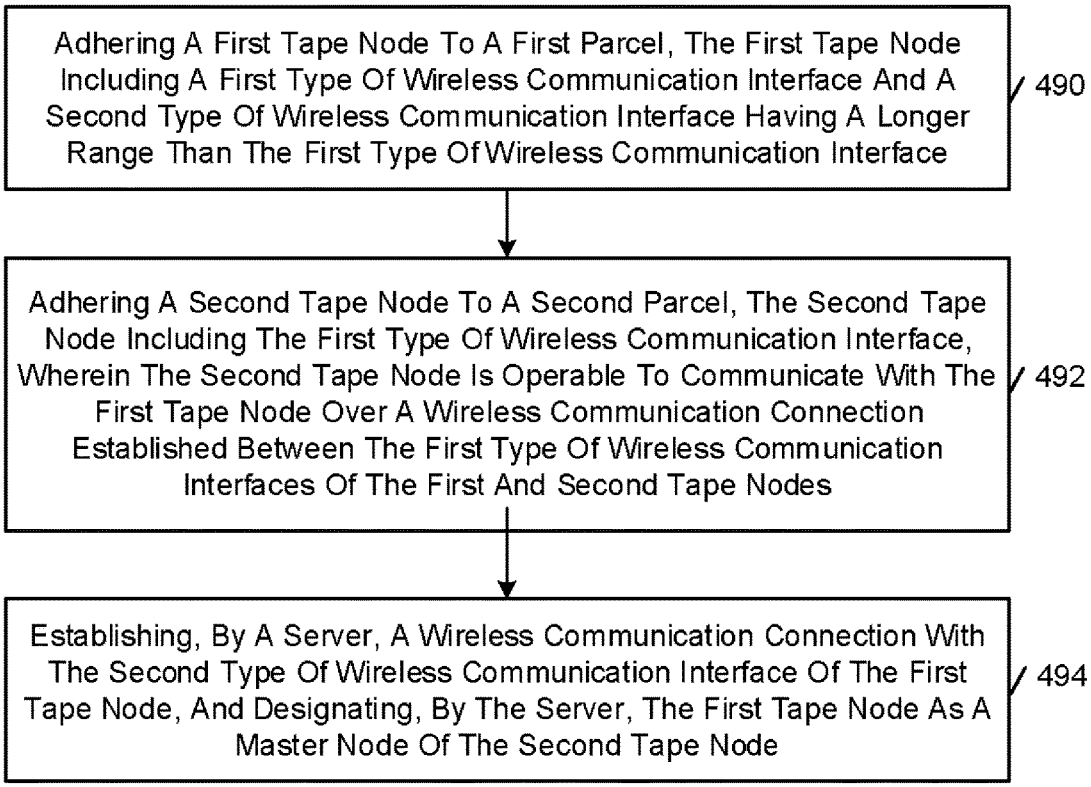
FIG. 11 is a flow diagram of a method of creating a hierarchical communications network.

FIG. 11 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 11, block 490). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 11, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 11, block 494).

V. Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Figure 16:
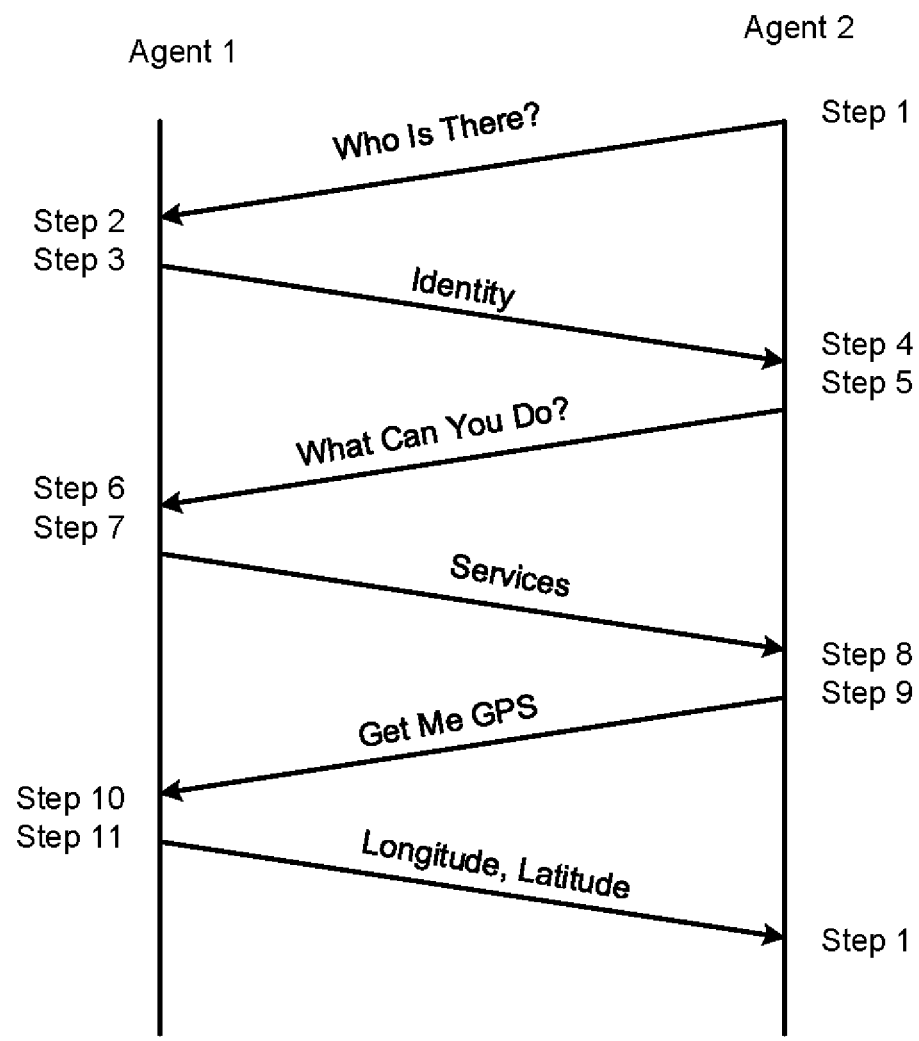
FIG. 16 is a timing diagram.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives FIG. 16 shows an example in which a second agent (Agent 2) establishes a communications path with a first agent (Agent 1) to obtain services from the first agent. In particular, the second agent transmits an advertising packet to the first agent (step 1). In response to receipt of the advertising packet (step 2), the first agent transmits its identity to the second agent (step 3). After receiving the identity information from the first agent (step 4), the second agent requests the services offered by the first agent (step 5). Based on the request from the second agent (step 6), the first agent transmits a list of services offered by the first agent (step 7). In response to receipt of the list of services offered by the first agent (step 8), the second agent requests the current location of the first agent (step 9). In response (step 10), the first agent transmits its longitude and latitude GPS coordinates to the second agent (step 11). The second agent receives the GPS coordinates (step 12).

Figure 18:
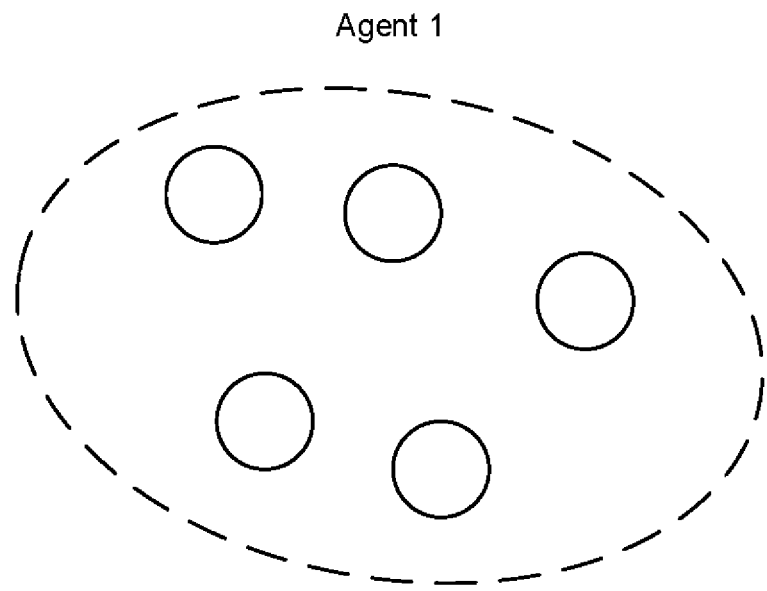
FIG. 18 is a diagrammatic view of an agent that includes a set of resources.

FIG. 18 is a diagrammatic view of an agent that includes a set of resources.

Figure 19:
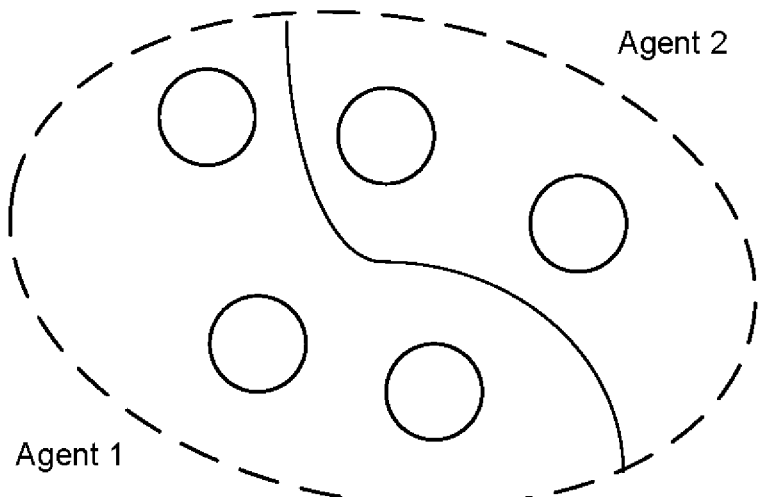
FIG. 19 is a diagrammatic view of the agent shown in FIG. 18 sharing resources with a second agent.

FIG. 19 is a diagrammatic view of the agent shown in FIG. 18 sharing resources with a second agent.

Figure 20:
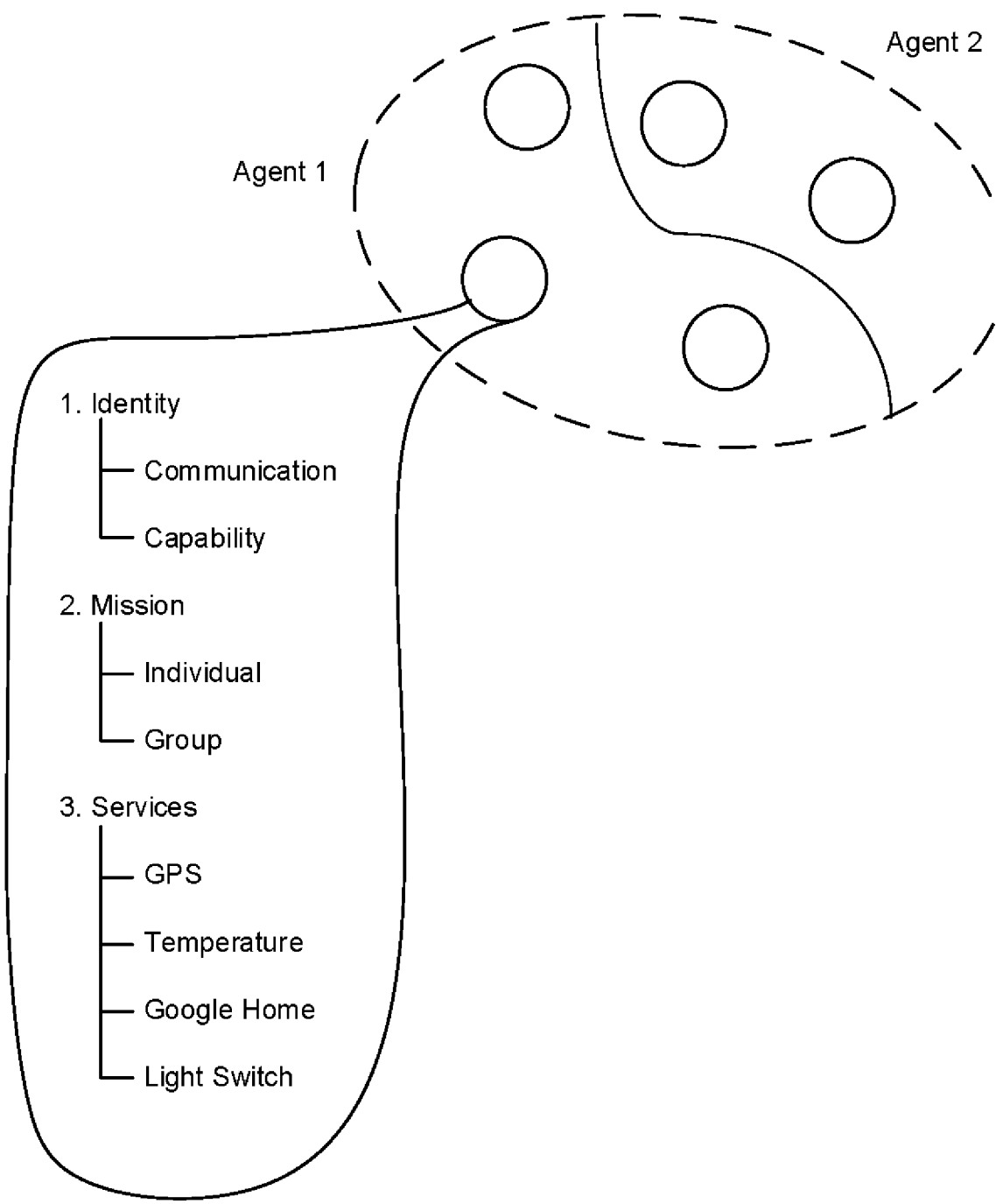
FIG. 20 is a diagrammatic view of an agent's characteristics.

FIG. 20 is a diagrammatic view of an example agent's attributes. In the illustrated example, the attributes of Agent 1 include an identity, a mission, and services. The agent's identity includes one or more communications interfaces and one or more capabilities. The attributes of Agent 1 also includes a mission, which may involve one or more agents including Agent 1. The Agent's services may include determining its geographic location (e.g., GPS), determining local temperature, interacting with electronic appliances (e.g., thermostat, doorbell, light switch, and other types of Internet-of-Things devices).

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 12A:
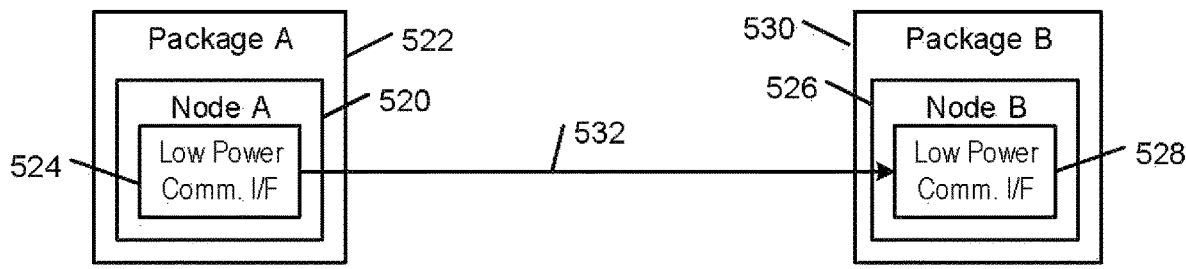
FIGS. 12A-12E are diagrammatic views of exemplary use cases for a distributed agent operating system.

Referring to FIG. 12A, a node 520 (Node A) is associated with a package 522 (Package A). In some embodiments, the node 520 may be implemented as a tape node that is used to seal the package 522 or it may be implemented as a label node that is used to label the package 522; alternatively, the node 520 may be implemented as a non-tape node that is inserted within the package 522 or embedded in or otherwise attached to the interior or exterior of the package 522. In the illustrated embodiment, the node 520 includes a low power communications interface 524 (e.g., a Bluetooth Low Energy communications interface). Another node 526 (Node B), which is associated with another package 530 (Package B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 12B:
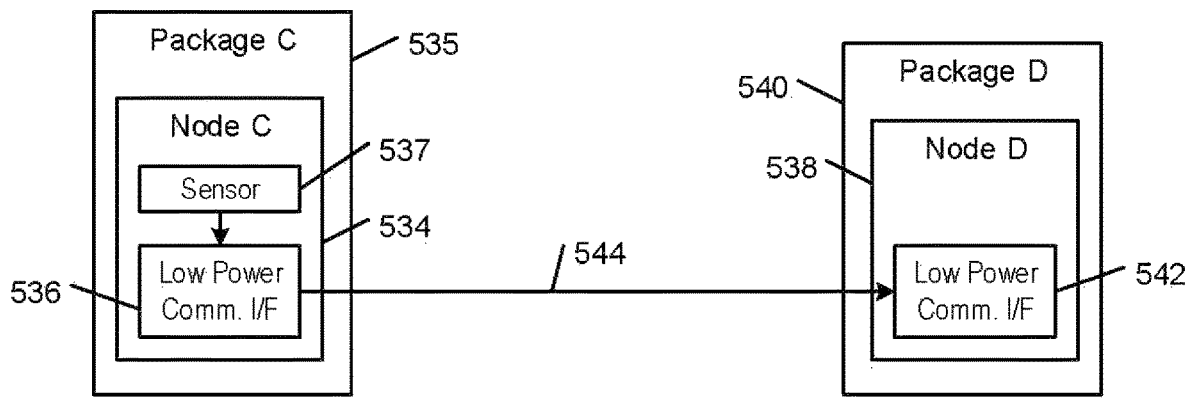

Referring to FIG. 12B, a node 534 (Node C) is associated with a package 535 (Package C). In the illustrated embodiment, the Node C includes a low power communications interface 536 (e.g., a Bluetooth Low Energy communications interface), and a sensor 537 (e.g., a temperature sensor). Another node 538 (Node D), which is associated with another package 540 (Package D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 12C:
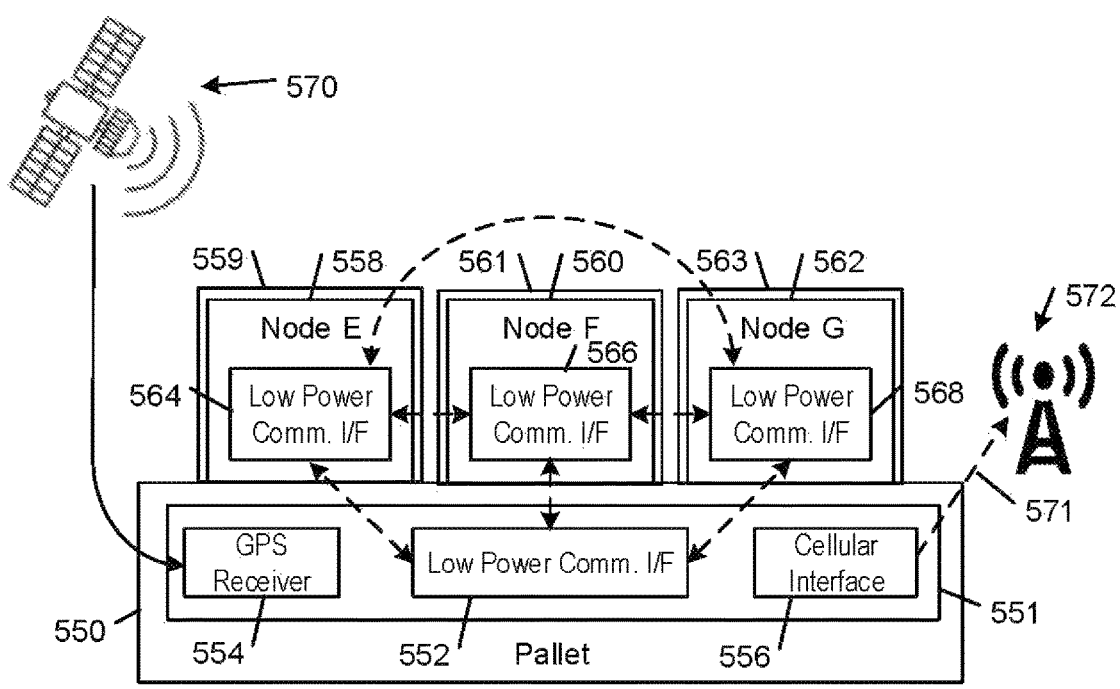

Referring to FIG. 12C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing packages 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the packages 559, 561, 563 are grouped together because they are related. For example, the packages 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the packages 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding packages 559, 561, 563 are intended to be grouped together (e.g., they share the same itinerary or certain segments of the same itinerary), the server authorizes the master node 551 to associate the peripheral nodes 558, 560, 562 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi-package group, the master node 551 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 558, 560, 562 include environmental sensors for obtaining information regarding environmental conditions in the vicinity of the associated packages 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the packages 559, 561, 563 from the master node 551 can be estimated based on the average signal strength of the advertising packets that the master node 551 receives from the respective peripheral node. The master node 551 can then transmit its own location and the locations of the package nodes E, F, and G to a server over a cellular interface connection with a cell tower 572. Other methods of determining the distance of each of the packages 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if packages that suppose to travel together no longer travel together, and raise an alert. For example, a node (e.g., the master node 551 or one of the peripheral nodes 558, 560, 562) alerts the server when the node determines that a particular package 559 is being or has already been improperly separated from the group of packages. The node may determine that there has been an improper separation of the particular package 559 in a variety of ways. For example, the associated node 558 that is bound to the particular package 559 may include an accelerometer that generates a signal in response to movement of the package from the pallet. In accordance with its intelligent agent program code, the associated node 558 determines that the master node 551 has not disassociated the particular package 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 12D:
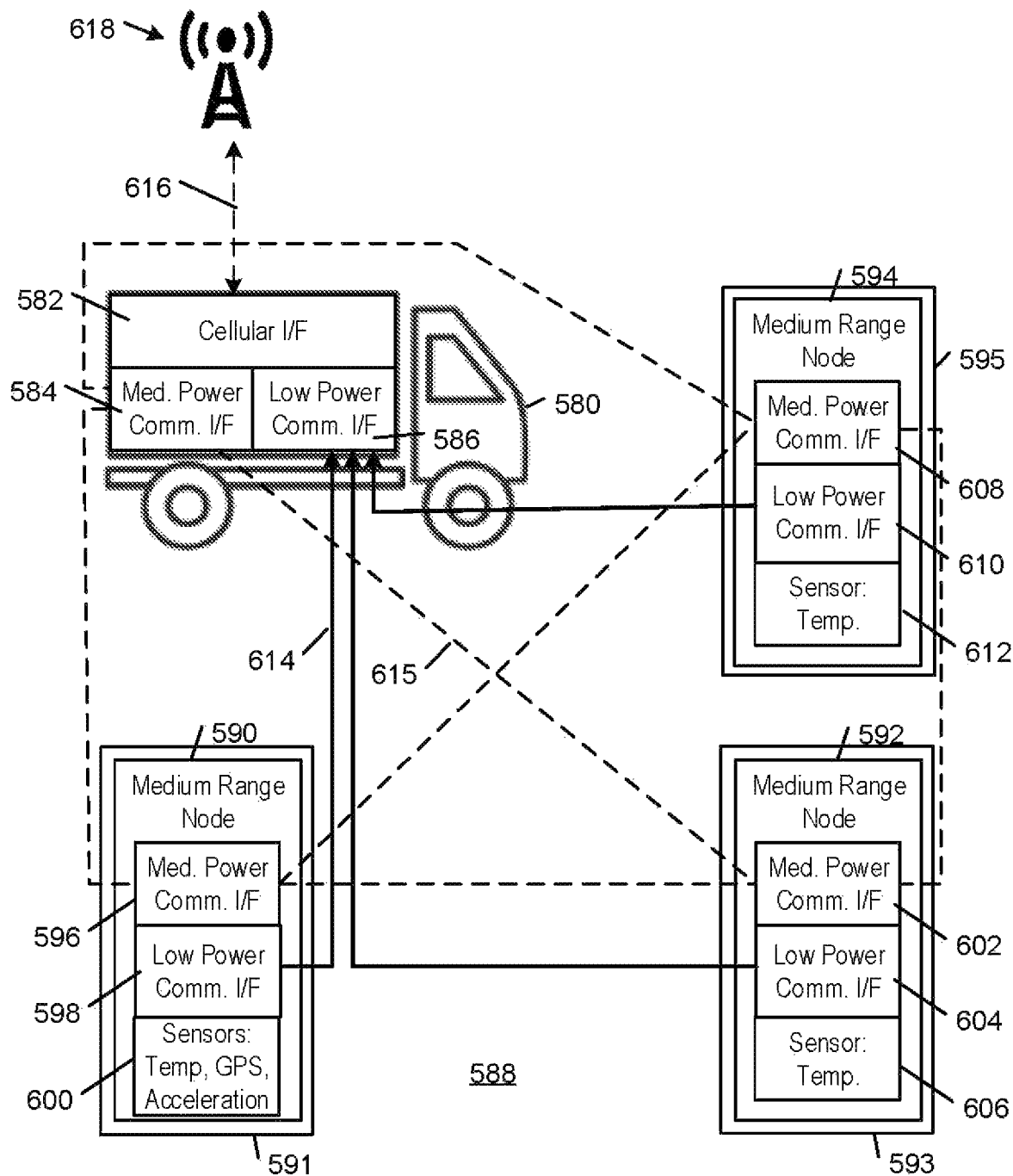

Referring to FIG. 12D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a logistic storage facility, such as a warehouse 588, to wirelessly obtain temperature data generated by temperature sensors in the medium range nodes 590, 592, 594. The warehouse 588 contains nodes 590, 592, and 594 that are associated with respective packages 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the package nodes 590, 592, 594 and the truck 580 is connected to each of the other ones of the package nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective logistic containers 591, 593, 595 (e.g., packages, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 12E:
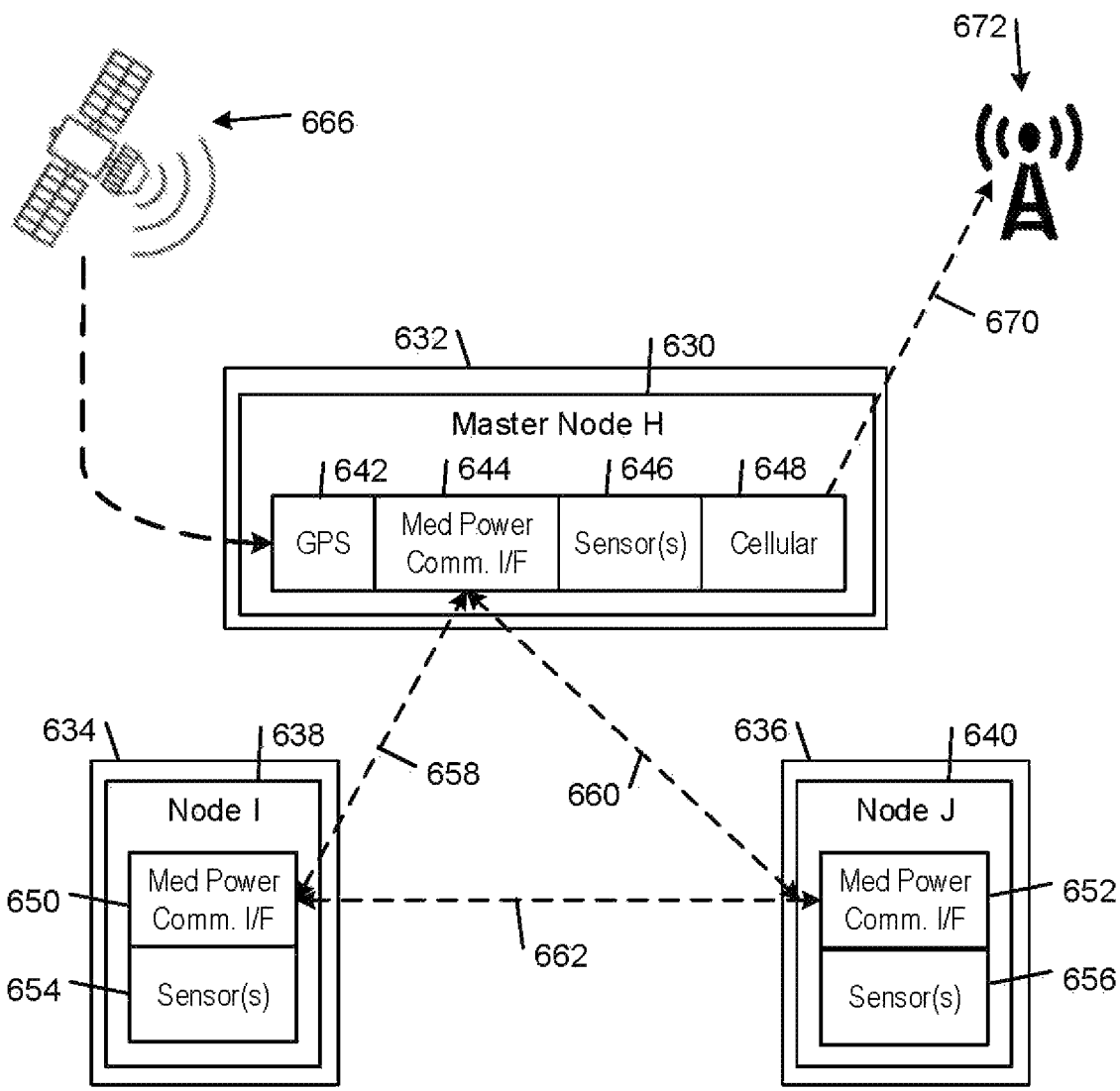

Referring to FIG. 12E, a master node 630 is associated with a logistic item 632 (e.g., a package) and grouped together with other logistic items 634, 636 (e.g., packages) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated packages 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the packages 634, 636 from the master node 630 can be estimated based on the average signal strength of the advertising packets that the master node 630 receives from the respective peripheral node. The master node 630 can then transmit its own location and the locations of the package nodes E, F, and G to a server over a cellular interface connection with a cell tower 672. Other methods of determining the distance of each of the packages 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

VI. Optimizing Global Objectives

A. Reducing Costs

Costs can be reduced in a variety of ways. For example, cost reductions can be achieved through the use of sampling nodes (e.g., sampling tape nodes) that include a particular distribution of different sets of components that are optimized to provide a statistical distribution of the node components that achieves high performance at lower costs. This applies to peripheral tape nodes, master tape nodes, and hybrid approaches. As explained above in connection with FIGS. 6A-6D, some logistics applications do not require tracking and/or sensor data for every parcel shipped. Instead, sufficient information for decision-making can be obtained by collecting data from a sample of the packages shipped. In these examples, a substantial reduction in tape node costs can be realized by selecting a sampling density of the deployed wireless transducing circuits 70 that achieves a target tracked package sampling rate that is less than unity. In these embodiments, some packages would not be tracked or monitored. However, the sample size can be selected to be sufficient to make inferences about a group of packages shipped with a desired level of accuracy.

Costs also can be reduced by managing the total cost of ownership. For example, reducing monthly subscription costs for communication, and reducing the number of GPS receivers that are deployed for a particular task. For example, instead of using a GPS received for every package in a group, only use one GPS receiver to determine the location of a particular package (e.g., the most expensive package) in a set of grouped packages; and the locations of other lower cost packages correspond to the GPS location of the particular package offset by the RSSI triangulation distances determined for the other packages. Combining triangulation with GPS may improve locationing accuracy or battery life.

Additional cost reductions can be achieved by extending the battery life of a master node by dynamically configuring another node in the group as a master node based on the current battery life of the other nodes. In some embodiments, nodes are configured to hibernate so they don't consume battery until they're triggered thru certain events (e.g., movement).

Performance can be improved through distributed data analytics and reporting. In some examples, peripheral tape nodes perform edge computing to aggregate data (e.g., create histograms) and send the aggregated data to a master node. The master nodes can process data received from the peripheral nodes to make decisions. For example, a master node may report an event or take an action to a server or a shipping carrier based on the analytics resulting from the master node processing of the peripheral node data. In some examples, the server manages power consumption by the master node and the peripheral nodes based on, e.g., power consumption analytics (e.g., by dynamically allocating roles, e.g., master and slave roles).

Sensors in tape nodes can be used to monitor environmental conditions experienced by a grouped set of packages (e.g., humidity, light, shock, temperature, acceleration, etc.). Improved sensor measurement accuracy can be achieved by aggregating data from multiple nodes bound to different packages.

B. Optimization

In some embodiments, a server implements a software operating system that executes program code that runs optimization algorithms. In some embodiments, the software operating system executes a simulation environment for optimizing key performance indicators (KPIs). In some embodiments, the operating system distributes functionalities across multiple agents that are associated with respective logistic items. For example, in some embodiments, the operating system dynamically allocates roles, such as master and slave roles, in the communications hierarchy in order to optimize battery life and improve the responsiveness in achieving overall system objectives. In some embodiments, the operating system distributes functionalities for applying analytics to logistical data to improve efficiencies and responsiveness. In some embodiments, the operating system manages transitions of the agents between different dynamic modes (e.g., power modes, role modes, such as master role/slave role, and primary role/backup role) to optimize the battery life of the respective ones of the nodes.

The approach described here is fault tolerant because it continues to operate despite logistic errors. The robustness of this approach is achieved, at least in part, by modeling logistic mistakes as deviations from binding/unbinding events. Examples of such events include detection of logistics execution errors if packages that are supposed to travel together no longer travel together and, in response, raise an alert; a master or peripheral agent (or more complex hierarchical structures) notifies the server when a package arrives in the region of the group; either one tape is serving as the beacon or identification of other tapes; multiple tape nodes serve this role.

Figure 17A:
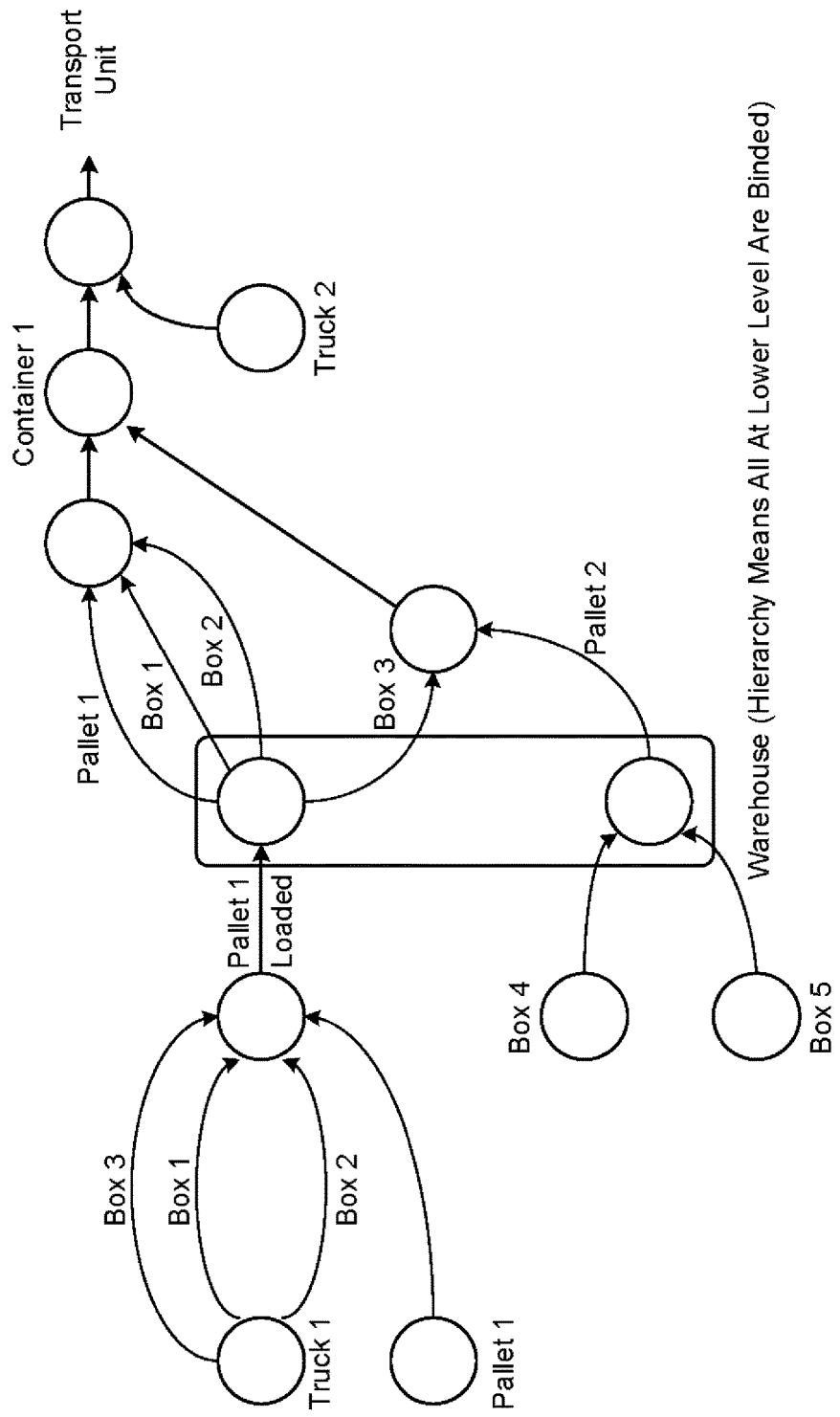
FIGS. 17A-17B are diagrammatic views of a supply chain model.

FIG. 17A is an example physical and transportation binding map that shows an exemplary sequence of binding and unbinding events involving vehicles, logistic containers, and storage facilities. In this example, truck 1 delivers Box 1, Box 2, and Box 3 to a warehouse, where they are loaded onto a Pallet 1. Box 4 and Box 5 are also loaded into the warehouse. Subsequently, Box 3, Box 4, and Box 5 are loaded onto a Pallet 2, which in turn is loaded into a Container 1. Box 1 and Box 2 remain on pallet 1 and are loaded into Container 1 along with Pallet 2. The Container 1 is loaded onto a Truck 2, which delivers the Container 1 to a Transport Unit.

Figure 17B:
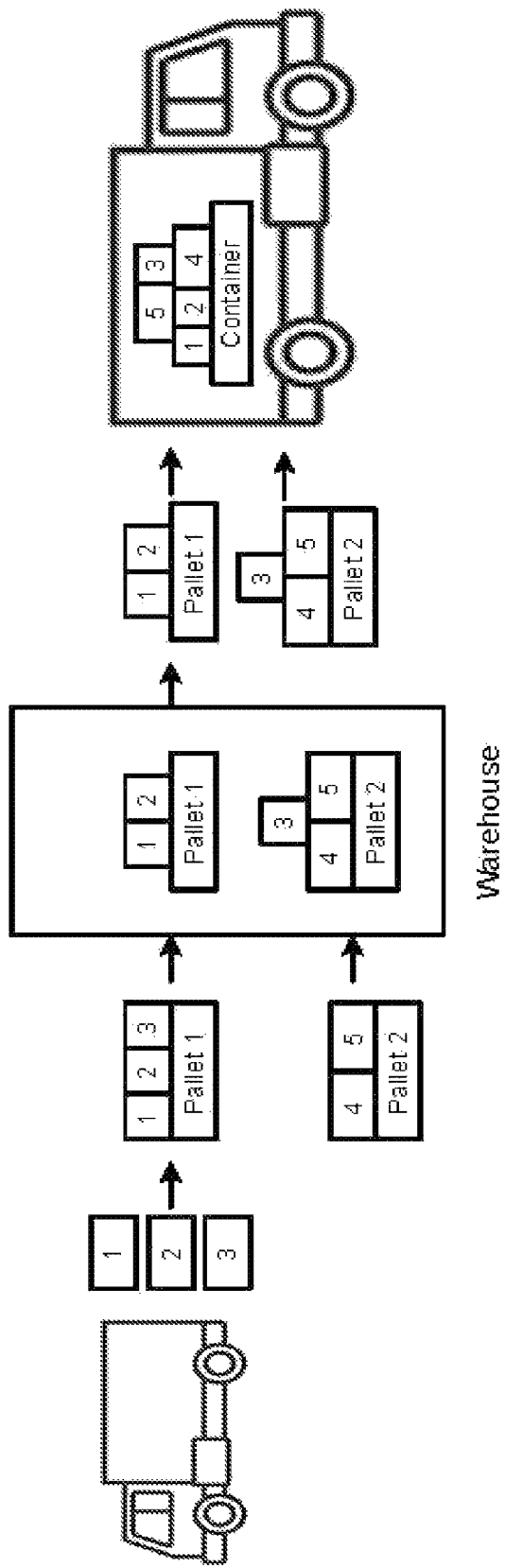

FIG. 17B depicts a storyboard presentation of the physical and transportation binding map shown in FIG. 17A.

Figure 13:
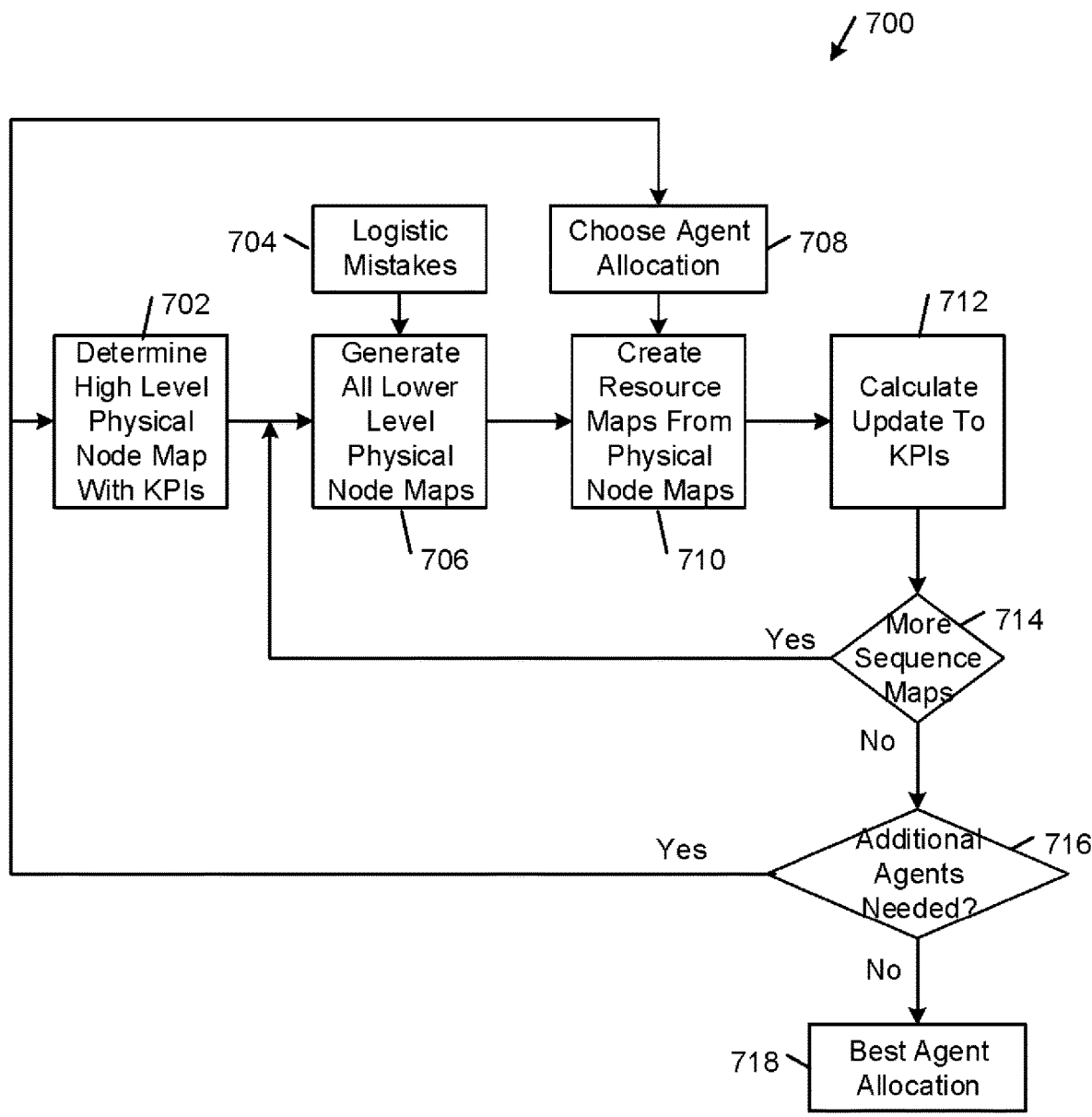
FIG. 13 is a flow diagram of an exemplary optimization process.

FIG. 13 shows an exemplary simulation method of optimizing the deployment of resources to achieve an optimal allocation of resources that optimize costs and key performance indicators. In some examples, the method determines the amount of redundancy needed (e.g., how many agents require temperature sensing capabilities within a particular area). For example, the for need redundant master nodes and peripheral nodes. A redundant master node may operate as a peripheral node until needed as a master node (e.g., when the current master node fails), and can add backup redundancy or backup capabilities.

Referring to FIG. 13, in an embodiment, the process of optimizing the deployment of node resources includes determining, by the server, a high-level physical node map with key performance indicators (KPIs) (FIG. 13, block 702). Example high-level KPIs include operational costs and maintenance costs. In an example, logistic mistakes are modeled as deviations from binding/unbinding events (FIG. 13, block 704). The server generates all lower level physical node maps based on the high-level physical node map and the logistic mistake models (FIG. 13, block 706). Based on a chosen agent allocation (FIG. 13, block 708), the server creates resource maps from the physical node maps (FIG. 13, block 710). The server updates the calculation of the KPIs based on the resource maps (FIG. 13, block 712). If there are additional sequence maps to create (FIG. 13, block 714), the server generates the lower level physical node maps based on the high-level physical node map and the logistic mistake models (FIG. 13, block 706). If there are no additional sequence maps to generate (FIG. 13, block 714), the server determines if any additional agents are needed to be deployed to optimize the allocation of agents (FIG. 13, block 716). If additional agents are needed (FIG. 13, block 716), the server choses an agent allocation (FIG. 13, block 708) and determines a high-level physical node map with KPIs (FIG. 13, block 702), and repeats the optimization; otherwise, the current agent optimization process cycle ends (FIG. 13, block 718).

VII. Scheduling Communications

As explained above, in some examples, the active components of the adhesive tape platform are activated (e.g., connected to the embedded power source) when a segment of the adhesive tape platform is cut (e.g., along a cut line) or when a segment of the adhesive tape platform is removed from a backing sheet. In these examples, there is no off-switch or sleep switch; instead, the resulting tape nodes remain activated until their respective power sources are depleted, at which point the power sources no longer power the active components thereby rendering the tape nodes non-functional until the power sources are replenished (e.g., by wireless charging, capacitive charging, or energy harvesting).

Although the tape nodes are relatively inexpensive compared to existing network technologies, it is still possible to manage and ideally reduce operational costs (e.g., wireless communications costs, such as cellular service costs) and maintenance costs (e.g., tape node and other infrastructure replacement costs). To this end, the network service 408 generates wireless transmission schedules specifying the times or conditions when the tape nodes at one level in the communication hierarchy should transmit their data packets up to the next level in the communication hierarchy. In this way, tape node power is conserved and wireless subscription usage is reduced compared to existing approaches. The problem of finding an optimal schedule can be formulated as an optimization problem with battery capacity of nodes, power consumption in various modes of operation, desired latency, external environment etc. and can be solved using modern optimization methods e.g. neural networks, artificial intelligence, and other machine learning computing systems that take expected and historical data to create an optimal solution and can create algorithms for modifying the schedule adaptively in the field.

In some examples, the communications are scheduled using a subset of the control code that is referred to herein as the "Global Scheduling Description Language" (GSDL) code. In these examples, the server 404 is configured to transmit a respective subset of the GSDL code to each tape node, where the respective GDSL code is stored in the standalone memory 96 and/or a memory component of the processor 90 in the respective wireless transducer circuit 70 of the respective tape node (see, e.g., FIG. 3). The GDSL code that is stored in memory is executed by the processor 90 of the tape node to programmatically perform one or more operations or tasks according to a specific schedule based on, for example, a specified time or upon satisfaction of one or more conditions or occurrence of one or more events.

The following is pseudo-code for an example of a GSDL programmatic control language instruction:

Take Action (X1, X2, . . . , XN) on Trigger (Y1, Y2, . . . , YM)

where (X1, X2, . . . , XN) refer to a sequence of one or more actions that the tape node will take in response to satisfaction of the one or more triggers (Y1, Y2, . . . , YM). A specific pseudo-code example of the GSDL code: Transmit Alarm_Type_1 on Measurement of Average_Temperature>65.0 degrees Fahrenheit from 30 measurements once per second for 30 seconds. Another pseudo-code example of the GSDL code: Transmit Temperatures of Box_1567 on Trigger GSP of Tape_Node_4357 is less than 5 kilometers away from Port_Y.

In general, the Action can be any action that can be performed by one or more components of a tape node, including one or more of the following actions: obtain data from a sensor; generate physical stimulus locally with a transducer component of the tape node; and transmit data packets to the network service. For example, a tape node may transmit a generic or type-specific alarm condition packet to the network service. In another example, a tape node may generate an alarm sound from a speaker component of the tape node or generate a flashing light from a light source component of the tape node. The trigger can be, for example, any type of phenomenon, data, or event that a tape node can determine, detect, or otherwise respond to, including one or more of the following triggers: time; event frequency; temperature; acceleration; deceleration; geographic location (e.g., GPS coordinates); and events associated with other tape nodes.

In a one example, a particular tape node includes a sensor (e.g., a temperature sensor) and the processor 90 executes programmatic GSDL code stored in a memory component of the particular tape node to activate the temperature sensor at a first time (e.g., 8 am PST) and record the sensed temperature data in memory 96 for a specified duration (e.g., 30 seconds) or a specified number of samples. At a second specified time (e.g., 11 pm PST), the processor 90 executes programmatic GSDL code to establish a connection with another node (e.g., a master tape node 424, 460 or a gateway 412, 420) that is configured to relay (or bridge) the data packets from the tape node to the network service 408, and then transmit one or more data packets containing the sensed temperature data to the network service 408 over the established connection.

In some examples, one or more human operators deploy tape nodes, gateway nodes, and other network communication infrastructure in a particular venue (e.g., a warehouse, a port, a loading dock, or other logistic location). In some examples, the network service 408 initializes a respective network for each venue by distributing portions of GSDL code to the respective nodes in the network, including peripheral tape nodes, medium range master tape nodes, long range master tape nodes, and master gateway nodes. In this process, one or more servers 404 of the network service 408 directs the transmission of the GSDL code portions through the network hierarchy from the top level nodes down to the bottom level peripheral nodes, where designated master nodes at the higher levels in the hierarchy manage and distribute the GSDL code portions to respective designated subsets of the nodes at lower levels in the hierarchy. The GSDL code portions program the nodes in the hierarchical communications network with respective schedules of all the communication and processing events that are relevant to the particular nodes. In this way, the network service 408 schedules all the events globally and directs the distribution of the respective GSDL code portions locally to each of the nodes through one or more master nodes at higher levels in the hierarchy. The network service 408 also can transmit GSDL code that changes, modifies or deletes the existing programmatic schedule of events for a particular node (e.g., when the schedule for the particular node changes).

After the GSDL code portions have been distributed to the respective nodes, the nodes typically synchronize their respective clocks and/or timers. The clocks and timers may be synchronized in any of a variety of conventional ways, including transmitting a periodic heartbeat communication between nodes (e.g., between a master node and one or more peripheral nodes in a designated logistic group), sending a series of packets containing synchronizing time stamp data for other nodes, and exchanging time stamps to determine and correct delays between nodes.

In one example, a master tape node associated with peripheral tape nodes in a designated logistic group (e.g., tape nodes adhered to respective parcels in a grouped set being shipped to the same destination) is configured to detect improper removals from the logistic group. In this example, the master tape node detects the presence of each peripheral tape node in the logistic group by transmitting ping packets to the peripheral tape nodes according to a schedule prescribed in the programmatic GSDL code portions installed in the memory of the master tape node (e.g., once every 10 minutes or every hour). If a peripheral tape node in the designated logistic group does not respond to a number of ping packets specified in the GSDL code portion stored in the master tape node, the master tape node logs the ID of the non-responsive peripheral tape node in its memory and reports the non-responsive peripheral tape node to a node at the next higher level in the communications hierarchy.

In another example, a master tape node associated with a designated logistic group of peripheral tape nodes is configured to detect improper consolidations into the logistic group. In this example, the master tape node periodically (e.g., every 10 minutes over every hour) sends a ping packet to each of the peripheral tape nodes and receives response packets from the pinged peripheral tape nodes according to a schedule prescribed in the programmatic GSDL code portions downloaded to the master and peripheral tape nodes. If the master tape node receives a response packet from a peripheral tape node that is not in the designated logistic group, the master tape node logs information that identifies the peripheral tape node in memory and reports the improper inclusion of the identified peripheral tape node a node at the next higher level in the communications hierarchy.

In some examples, tape nodes are configured to switch roles from a peripheral tape node to a master tape node and vice versa in response to particular criteria defined in their respective GSDL code portions. In these examples, a designated logistic group consists of a current master tape node and one or more peripheral tape nodes. In an example, the tape nodes are adhered to respective parcels in a grouped set being shipped to the same destination. The current master tape node periodically (e.g., every 10 minutes over every hour) sends a ping packet to each of the peripheral tape nodes in the logistic group and receives response packets from the pinged peripheral tape nodes according to a schedule prescribed in the programmatic GSDL code portions downloaded to the master and peripheral tape nodes. The current master tape node logs information that identifies peripheral tape nodes that fail to respond to a designated number of pings and responses from peripheral tape nodes that are not identified in the designated logistic group. The current master tape node also periodically queries the battery levels of the peripheral tape nodes in the logistic group and reports the battery levels of the peripheral tape nodes as well as its own battery level to a server 404 of the network service 408. Based on the respective battery levels of the tape nodes, the network service 408 determines whether to demote the current master tape node to a peripheral tape node role and promote one of the peripheral tape nodes to the current master tape node role. In an example, the network service 408 demotes the current master tape node to peripheral tape node status if its battery level is below 20% of its original capacity and promotes the peripheral tape node that has the higher battery level greater than 20% to master node status. In another example, the network service 408 designates the tape node having the highest battery level as the current master tape node.

VIII. Distributed Data Processing

As explained above, once they are deployed and initialized, the tape nodes constitute a hierarchical sensor network that includes a bottom level of peripheral tape nodes that typically are associated with and configured with respective sensors to monitor respective assets (e.g., parcels, persons, tools, equipment, infrastructure, and other physical assets and objects), and additionally includes one or more higher levels of tape nodes (e.g., master tape nodes and gateways) that are configured to communicate with the lower level nodes and also may be configured with respective sensors.

In some examples, after collecting sensor data according to its installed GSDL code, a sensor tape node will transmit the collected data in one or more data packets to a server node 404 of the network service 408 through one or more tape nodes at one or more higher levels in the communications hierarchy. In these examples, the one or more server network nodes 404 of the network service 408 processes the received data to generate analytics providing visibility at different levels in the hierarchical sensor network. However, in order to achieve real-time or near real-time monitoring performance, this approach requires each tape node to transmit a significant amount of data, which imposes a significant drain on the tape nodes power sources that significantly reduces the lives of the tape nodes.

In other examples, the tape nodes themselves are capable of processing sensor data and aggregating the processed sensor data locally, thereby significantly reducing the amount of data that needs to be transmitted by the tape nodes and greatly extending their useful lifetimes. In an example, a peripheral tape node collects a set of sensor data of a particular type (e.g., location, capacitance, altitude, orientation, acceleration, temperature, strain, pressure, shock, vibration, weight, light, sound, smoke, radioactivity, chemicals, magnetism, electromagnetism, and humidity). The peripheral tape node processes (e.g., aggregates) the collected data to generate a compressed representation of the data, for example, a histogram of the processed data over a range variable (e.g., time, location, parcel identifier, tape node type, etc.). Instead of transmitting the original collected data, the peripheral tape node transmits the compressed representation of the processed data (e.g., the range values and bin counts) to the associated master node at the next level up in the communication hierarchy (e.g., the box, pallet, or container level). The master node, in turn, combines the compressed representations of the data collected from multiple of the associated peripheral tape nodes to generate analytics at the box, pallet, or container level. The aggregation process continues up through the hierarchy to obtain visibility into each level. In addition to transmission of the compressed data up in the hierarchy for decision-making at higher hierarchical levels, each tape node is also capable of analyzing the collected data, compressing the results, and making certain decisions locally within the node. In some examples, a tape node calculates statistics from the collected data, analyzes the calculated statistics against one or more criteria, and takes an action in response to the results of the analysis. For example, the tape node may produce a audible alarm of transmit an alarm data packet to the network service 408 in response to a determination that there has been a temperature violation with respective to a particular parcel.

Figure 14:
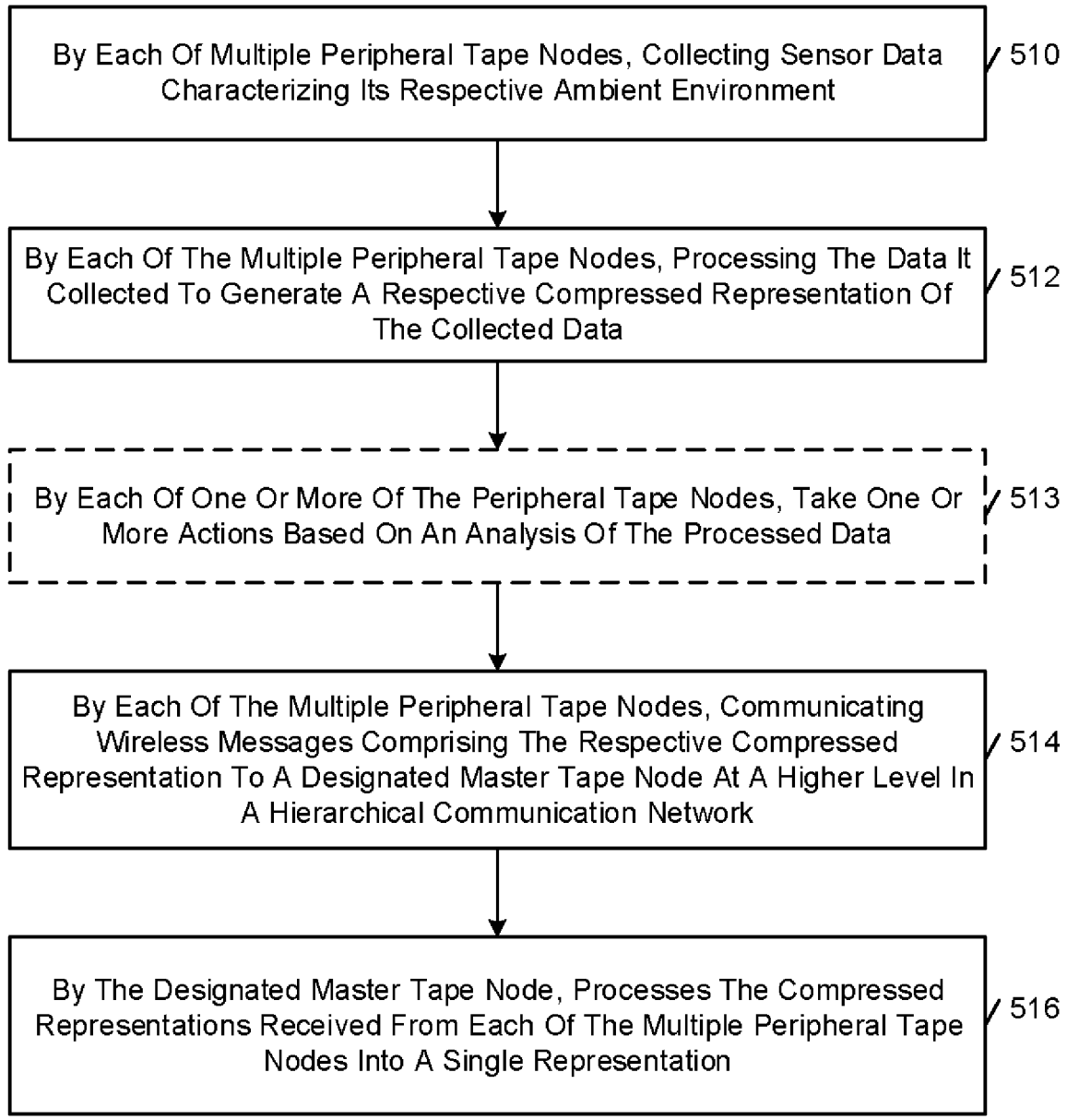
FIG. 14 is a flow diagram of a distributed method of processing sensor data by hierarchal arrangement of wireless communication devices.

FIG. 14 shows an example process by which multiple tape nodes perform distributed computing of sensor data. Each peripheral tape node collects sensor data characterizing its respective ambient environment (FIG. 14, block 510). Each peripheral tape node processes the respective data that it collected to generate a respective compressed representation of the collected data (FIG. 14, block 512). In some examples, one or more of the tape nodes are programmed to autonomously take one or more actions based on an analysis of the processed data (FIG. 14, block 513). Each peripheral tape node communicates one or more wireless messages including the respective compressed representation to a designated master tape node at a higher level in the hierarchical communication network (FIG. 14, block 514). The designated master tape node processes the compressed representation received from each of the multiple peripheral tape nodes into a single representation (FIG. 14, block 516).

Tape nodes may be configured to generate statistics for phenomena other than the ambient conditions of parcels and other containment units. In some examples, a master tape node generates analytics regarding improper splits or separations from designated logistic groups of tape nodes and improper consolidations into designated logistic groups of tape nodes. In an example, a master tape node associated with multiple designated logistic groups of peripheral tape nodes generates analytics (e.g., the frequency of improper splits or separations of assets from the designated logistic group) for a particular logistic entity. In another example, a master tape node is associated with multiple designated logistic groups of peripheral tape nodes generates analytics (e.g., the frequency of improper consolidation of assets with the designated logistic group) for a particular logistic entity.

Figure 15:
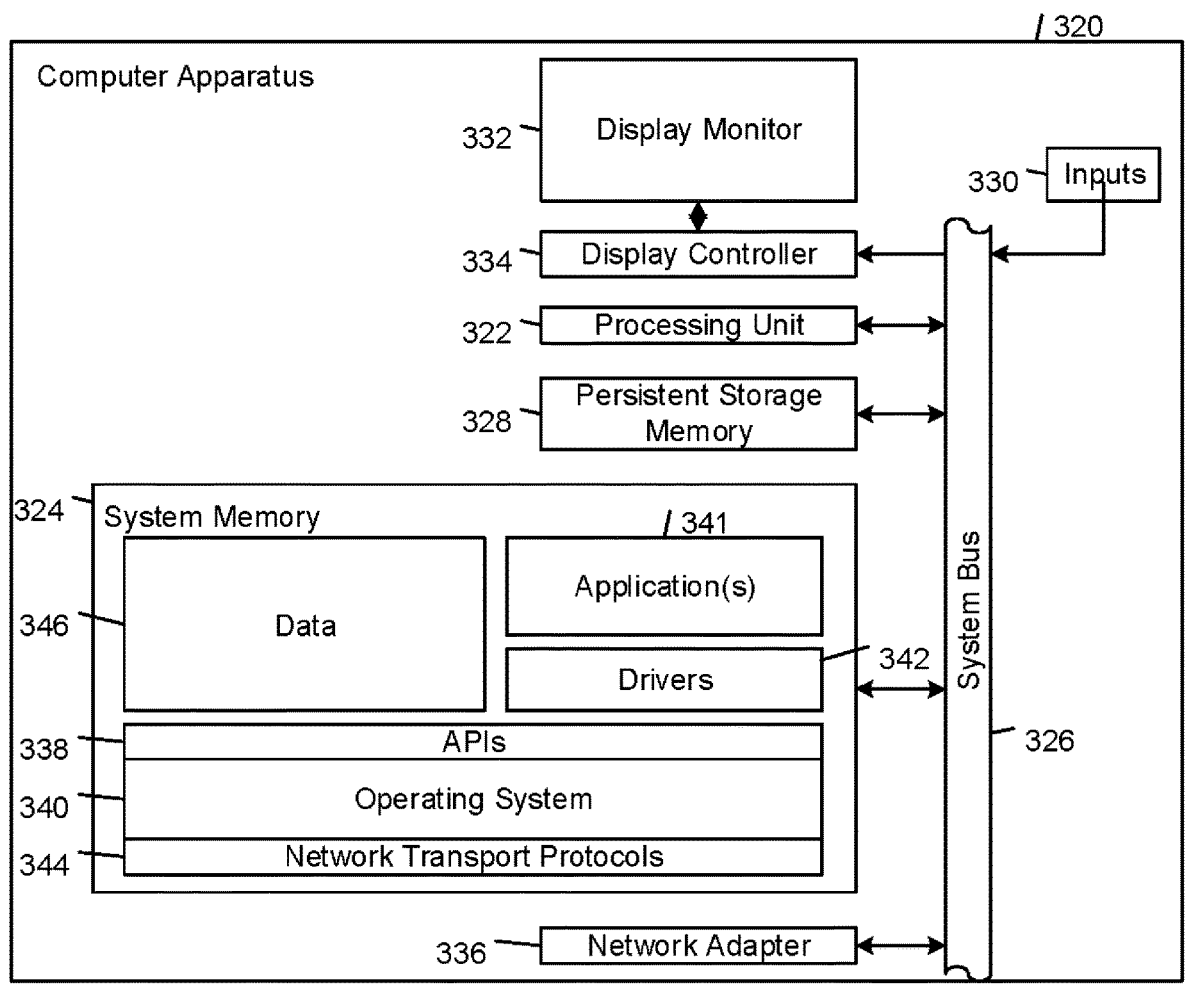
FIG. 15 is a block diagram of an example computer apparatus.

FIG. 15 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

IX. Security and Tape Infrastructure

As mentioned earlier, communications among tapes nodes, the communication is secured through a custom security mechanism. In certain cases, tape nodes can also be configured to support block chain to protect the transmitted and stored data. However, the Block Chain implementation differs from the conventional block chain used in the industry e.g. Crypto Currency. Tape application uses a concept of distributed block-chains. The components of distributed block chains are described below.

1. Parallel Non-Communicating Block Chains of Independent Clusters of Transactions Standard block chains needs to store the complete transaction history (distributed across all nodes) because the final balances for each public key depend on the cumulative effect of all previous transactions. This causes significant memory issues if you want to apply the standard block chain in tape application. However, unlike the currency application, not every transaction is dependent upon each other in a way that affects the cumulative outcome.

In the Tape environment, we define a graph where the nodes are transactions among tapes and the edges define dependencies between these transactions. For example, transactions can have dependencies because the underlying process competes for the same resources (e.g., a container). However, instead of defining the graph with each tape being a node, we identify cluster of tapes that are independent using graph algorithm and define the nodes of the graphs to be clusters. Every cluster will need to have a certain number of nodes though to have enough cross checking within the distributed network. Example of a cluster is a trucker loads 5 boxes, then the trucker unloads 3 boxes at location A and then unloads 1 box in location B and then claims no boxes left. An improved algorithm would be to define the independent clusters of minimal number of nodes for cross checking effectiveness as done in standard packing algorithms.

2. Block Chain Transaction Time Arbitrage & Block Queue

Block chain in the traditional applications (e.g. Crypto Currencies) is optimized for transaction completion time, which relies on the proof of work of the whole network as a way to beat any individual hacker, and hence requires a lot of time. This is important in those applications because it is a currency (time=money; trading). Moreover, you want to prevent double spending (so you need to wait till the distributed network of chain copies are stabilized and everybody agrees before you allow spending the money you just received).

However, in tape application, transaction time is actually less important as long as we queue them up and secure them against hackers (which can be done using basic encryption onboard of our tape). The actual mining to tie the transactions into a chain (i.e., the computational intensive part) and stabilize the distributed network can be done at a time when the cost of doing these activities is cheaper (in terms of battery life or storage). We can store the blocks or transactions in a queue (encrypted) and schedule processing them in an efficient matter.

3. Communicating Hierarchical Block Chains of Clusters of Transactions

The ability to arbitrage transaction time enables other useful features. In tape environment, not all tapes are accessible every point in time. We can schedule interaction time to communicate (in a secure matter) between multiple levels of block-chains. This guarantees security at higher levels of abstractions. The hierarchy of block chains can be optimized to reduce memory and computational requirements at lower levels while reducing latency in terms of due diligence requests (e.g., because parties in the logistics chain disagree). For example, our infrastructure components (such as the stationary and mobile gateway) can run a higher level abstraction block chain both from a storage perspective as well as from a computational perspective (e.g. the system can have three levels: the tape, mobile gateways like 412 in FIG. 9, and stationary gateways (414 in FIG. 9) that are always connected.

4. Lossless Block Chain Storage Compression of (Partial) Dependent Clusters

Communicating hierarchical block chains enable more features. After details are communicated to a higher-level block chain in a secure matter, the lower level block chains are compressed where dependent clusters of transactions are stored only a hash (i.e., not the actual details) called compressed transaction cluster. The higher level still stores the actual details. This reduces the need to store all dependent transactions at every level while still guaranteeing same security & resilience. The actual transactions are lost at the lower block chain but still can be recovered at the higher-level block chain.

5. Lossy Block Chain Compression of Dependent Clusters

Another advantage of transaction time arbitrage and dependent clusters of transactions is that when all parties involved in a dependent cluster of transactions agree on the successful completion of the dependent set of transactions, then we then don't need to store the cluster anymore (not in lower level block chains nor higher level block chains). Note that these events can happen many times before the tape actually gets shipped from A to B. The chains can be pruned to get rid of data and replace it with a completion flag (to keep security).

6. Memory Overflow Resolution

In order to limit the memory overflow issues in tape application, where available memory is limited, an optimization algorithm is used to find a global optimal solution would be analyzing the full graph of all transactions and assigning weights as to what the cost would be if a hacker would invalidates parts of this. The general optimization algorithm can be improved by analyzing dependent clusters independently (collapsing them based on certain threshold/compromises). As an example simple set of timers stored in the block chain capturing the number of completed dependent transactions may be one way to prioritize the branches to be pruned in the solution search space.

7. Centralized Mining Server

Another component of the distributed block chain system is the use of centralized mining server where tapes/nodes nodes can fetch useful puzzles from a server (or a hierarchy thereof). The distribution of these tasks can use the traditional SHA256 hash and block chain to secure the data.

8. Tape Block Chain API, OS, and Interposer Layer with a Library of Third Party Block Chain APIs The Distributed block chains used in the tape environment are encapsulated at the API level and provide an interface to communicate with the existing block chain used in the industry.

Communicating hierarchical block chains make the tape the lowest common denominator and actually be the connecting tissue between different block chain standards. A generic block chain API and a wrapper framework that encapsulates third party block chain APIs allows tape distributed block chain to communicate with other block chain eco-systems. This creates an abstraction that allows tape Operating system (tape Logistics OS) to only interact with tape distributed block chain API.

The invention claimed is:

1. A distributed agent operating system, comprising:
    wireless hardware nodes operable to execute respective agent software instructions stored in respective memory components of the wireless hardware nodes to perform respective tasks and assume respective hierarchical roles across the wireless hardware nodes, wherein each wireless hardware node comprises
        a respective identity defined by a respective set of capabilities of the wireless hardware node,
        a respective set of mission objectives to be performed by the wireless hardware node in accordance with the respective agent software instructions, and
        a respective set of services of the wireless hardware node to be offered to other wireless hardware nodes in accordance with respective agent software instructions,
        wherein the wireless hardware nodes are configured to communicate with one another, coordinate interactions between wireless hardware nodes, and respond to events based on the respective agent software instructions; and
    additional agent software instructions stored on and executable by one or more of the wireless hardware nodes to use the respective identities, the respective sets of mission objectives, and the respective sets of services to be offered to dynamically allocate hierarchical roles that are performed by respective ones of the wireless hardware nodes in accordance with the respective agent software instructions stored in respective memory components of the wireless hardware nodes.

2. The distributed agent operating system of claim 1, wherein one or more of the wireless hardware nodes are bound to one or more logistic entities.

3. The distributed agent operating system of claim 1, wherein, the respective set of mission objectives of a first wireless hardware node comprises: after the first wireless hardware node successfully pairs with a second wireless hardware node, the first wireless hardware node is operable to determine information about the second wireless hardware node, the information including identity information, capabilities, and services provided by the second wireless hardware node.

4. The distributed agent operating system of claim 3, wherein:
    the respective set of capabilities of the second wireless hardware node comprises a capability of reporting a current battery life level of the second wireless hardware node;
    the respective set of services of the second wireless hardware node comprises a service of transmitting the current battery life level to other of the wireless hardware nodes; and
    the respective set of mission objectives of the second wireless hardware node includes, in response to a request from the first wireless hardware node, the second wireless hardware node transmitting an indication of the current battery life level to the first wireless hardware node.

5. The distributed agent operating system of claim 3, wherein:
    the respective set of capabilities of the second wireless hardware node comprises a capability of determining temperature data from a temperature sensor, and
    the respective set of services of the second wireless hardware node comprises a service of transmitting temperature data to other nodes; and,
    the respective set of mission objectives of the second wireless hardware node includes, in response to a request from the first wireless hardware node, the second wireless hardware node determines and transmits temperature data to the first wireless hardware node.

6. The distributed agent operating system of claim 1, wherein:
    the wireless hardware nodes comprise at least a first wireless hardware node and a second wireless hardware node;
    the respective set of capabilities of a second wireless hardware node comprises a capability of determining temperature data from a temperature sensor; and
    the respective set of mission objectives of the second wireless hardware node comprises is operable to processing the temperature data and transmitting the processed temperature data to the first wireless hardware node.

7. The distributed agent operating system of claim 1, further comprising a conveyor operable to convey a grouped set of logistic items, wherein a first one of the wireless hardware nodes is a master node and is bound to the conveyer, and a set of other ones of the wireless hardware nodes are bound to respective packages that are grouped together on the conveyer; wherein, the respective set of mission objectives of the master nodes comprises: in response to receipt of one or more advertising packets from the other wireless hardware nodes, the master node requests authorization from a server to associate the set of other wireless hardware nodes as a grouped set of wireless packages.

8. The distributed agent operating system of claim 7, wherein the conveyor comprises one of a pallet and a container.

9. The distributed agent operating system of claim 7, further comprising a group identifier defined at the server, the group identifier including master node and other wireless hardware nodes registered therewith.

10. The distributed agent operating system of claim 9, further comprising an association defined at the server, the association including each node identifier with a respective physical label identifier that is adhered to the respective package.

11. The distributed agent operating system of claim 7, wherein the respective set of mission objectives of the master nodes comprises: in response to arrival of another wireless hardware node associated with another package in a vicinity of the grouped set of packages, the master node requests authorization from the server to associate the another wireless hardware node associated with the another package with the grouped set of packages; merge the another package with the grouped set of packages in response to a received instruction from the server.

12. The distributed agent operating system of claim 7, wherein the respective set of mission objectives of the master nodes comprises: the master node monitors respective signal strengths of advertising packet signals transmitted from the other wireless hardware nodes in the grouped set of packages; and, in response to detection of a decreasing signal strength over time below a threshold in one or more of the monitored advertising packet signals, the master node is operable to issue an alert.

13. The distributed agent operating system of claim 12, wherein the alert is a local audio alert, or an electronic alert transmitted to the server.

14. The distributed agent operating system of claim 1, wherein a hierarchy of wireless hardware nodes is located in a mobile vehicle and are operable to communicate wirelessly with corresponding ones of the wireless hardware nodes associated with logistic entities outside the mobile vehicle.

15. The distributed agent operating system of claim 14, wherein:
the logistic entities comprise one or more of a pallet, a package, and a container;
the corresponding ones of the wireless hardware nodes are associated with logistic entities within a warehouse, and the wireless hardware nodes deployed in the mobile vehicle are operable to pair with the corresponding ones of the wireless hardware nodes associated with logistic entities by a process comprising determining each other's identities, capabilities, and services;
at least one of the wireless hardware nodes deployed in the mobile vehicle determines that a corresponding one of the wireless hardware nodes in the warehouse has a capability of measuring and transmitting the measured temperature data to other nodes; and
in response to a determination that any of the wireless hardware nodes fails to respond to repeated broadcasts of low-power advertising packets by the wireless hardware nodes deployed in mobile vehicle, the wireless hardware nodes deployed in mobile vehicle broadcasts higher power advertising packets into the warehouse.

16. The distributed agent operating system of claim 1, wherein:
the respective set of mission objectives are defined by respective agent software instructions received from one or more of a server node and a master node;
after each of multiple wireless hardware nodes are configured with a respective identity, mission, and one or more services, the wireless hardware nodes are operable to communicate with one another and request services from and provide services to one another independently of any server; and
the respective agent software instructions program each of one or more of the wireless hardware nodes with one or more respective mission objectives and a respective definition of resources needed to fulfill the one or more mission objectives.

17. The distributed agent operating system of claim 1, wherein:
the respective set of mission objectives of a first wireless hardware node includes:
periodically broadcasting advertising packets into a geographic area and, in response to receiving an advertising packet from a second wireless hardware node within wireless communications range, extracting a network address of the second wireless hardware node to determine whether it is authorized to connect with the second wireless hardware node; and
after the first wireless hardware node determines that it is authorized to communicate with the second wireless hardware node attempting to establish a communications connection with the second wireless hardware node by exchanging identities, capabilities, and services with the second wireless hardware node.

18. The distributed agent operating system of claim 17, wherein the respective set of mission objectives of the second wireless hardware node includes:
after establishing the communications connection with the first wireless hardware node, determining, by the second wireless hardware node, an identity of the first wireless hardware node, one or more capabilities of the first wireless hardware node including a capability of reporting current battery life to other wireless hardware nodes; and
receiving in response to a request from the second wireless hardware node, an indication of a current battery life of the first wireless hardware node transmitted from the first wireless hardware node to the second wireless hardware node.

19. The distributed agent operating system of claim 17, wherein the respective set of mission objectives of the second wireless hardware node includes:
after establishing the communications connection with the first wireless hardware node, determining, by the second wireless hardware node, an identity of the first wireless hardware node, one or more capabilities of the first wireless hardware node including a capability of retrieving sensor data from the first wireless hardware node, and one or more services available from the first wireless hardware node including transmitting the sensor data to other wireless hardware nodes; and
receiving in response to a request from the second wireless hardware node, an indication of the retrieved sensor data is transmitted from the first wireless hardware node to the second wireless hardware node.

20. The distributed agent operating system of claim 1, wherein:
- the wireless hardware nodes comprise at least a first wireless hardware node and a second wireless hardware node;
- the respective set of capabilities of a second wireless hardware node includes location-identifying capability;
- the respective set of mission objectives of a first wireless hardware node comprises determining location of the first wireless hardware node;
- the first wireless hardware node is configured to perform the determining location by:
  - receiving the identity of the second wireless hardware node,
  - based on the identify of the second wireless hardware node, requesting services offered by the second wireless hardware node,
  - receiving, at the first wireless hardware node and from the second wireless hardware node, a list of services offered by the second wireless hardware node,
  - based on the list of services, requesting location of the second wireless hardware node, and
  - receiving, at the first wireless hardware node, location of the second wireless hardware node, and
  - determining location of the first wireless hardware node based on the location of the second wireless hardware node.

* * * * *